(12) United States Patent
Hanumanthaiah et al.

(10) Patent No.: US 12,399,548 B2
(45) Date of Patent: Aug. 26, 2025

(54) INTERFACE FOR INTEGRATING PHYSICALLY DISTANT PRINTED CIRCUIT BOARDS (PCBS) IN A WEARABLE DEVICE

(71) Applicant: QUALCOMM Incorporated, San Diego, CA (US)

(72) Inventors: Shruti Hanumanthaiah, Bangalore (IN); Vinayakumar Prakash Mallapur, Belgaum (IN)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 18/113,035

(22) Filed: Feb. 22, 2023

(65) Prior Publication Data

US 2024/0281048 A1  Aug. 22, 2024

(51) Int. Cl.
*G06F 1/32* (2019.01)
*G06F 1/3234* (2019.01)
*G06F 13/24* (2006.01)

(52) U.S. Cl.
CPC .............. *G06F 1/325* (2013.01); *G06F 13/24* (2013.01)

(58) Field of Classification Search
CPC . G06F 1/325; G06F 13/24; G06F 1/26; G06F 13/4282; G06F 1/30
See application file for complete search history.

(56) References Cited

U.S. PATENT DOCUMENTS

| | | | |
|---|---|---|---|
| 5,878,234 A * | 3/1999 | Dutkiewicz | H04L 12/40 710/110 |
| 2007/0090894 A1* | 4/2007 | Phan | H05K 3/4691 333/33 |
| 2009/0161588 A1* | 6/2009 | Maldonado | H04B 1/0483 370/342 |
| 2016/0224442 A1 | 8/2016 | Sanghi et al. | |
| 2018/0359867 A1* | 12/2018 | Weber | H05B 3/84 |
| 2019/0064910 A1* | 2/2019 | Wang | G06F 1/263 |
| 2019/0082114 A1 | 3/2019 | Jeon | |
| 2019/0227971 A1* | 7/2019 | O'Shea | G06F 13/4282 |
| 2019/0250697 A1* | 8/2019 | Mocanu | G06F 3/0604 |
| 2019/0389049 A1* | 12/2019 | Kim | B25J 11/0005 |
| 2021/0388966 A1* | 12/2021 | Ruan | F21V 31/005 |
| 2022/0248572 A1* | 8/2022 | Jung | G02B 27/01 |
| 2022/0253358 A1* | 8/2022 | Meunier | G06F 11/1441 |

(Continued)

FOREIGN PATENT DOCUMENTS

CN  1740930 A  3/2006

OTHER PUBLICATIONS

International Search Report and Written Opinion—PCT/US2024/010927—ISA/EPO—May 14, 2024.

*Primary Examiner* — Danny Chan
(74) *Attorney, Agent, or Firm* — Seyfarth Shaw LLP

(57) ABSTRACT

An apparatus comprises a first printed circuit board (PCB) supporting a master subsystem including a master power management integrated circuit (PMIC) coupled to a master processor via a first local interface. The apparatus also comprises a second PCB supporting a slave subsystem including a slave PMIC coupled to a slave processor via a second local interface. The apparatus further comprises a first bi-directional control interface coupling the master processor to the master PMIC and to the slave PMIC. The first bi-directional control interface comprises at least one trace overloaded to carry multiple PMIC functions.

24 Claims, 19 Drawing Sheets

(56) References Cited

U.S. PATENT DOCUMENTS

| | | | |
|---|---|---|---|
| 2022/0287180 A1* | 9/2022 | Yang | H05K 1/0298 |
| 2022/0300056 A1* | 9/2022 | Yamada | G06F 1/3206 |
| 2023/0019075 A1* | 1/2023 | Seok | G06F 1/30 |
| 2023/0083895 A1* | 3/2023 | Uhm | G02B 27/0176 345/8 |
| 2023/0176371 A1* | 6/2023 | Lee | G02B 27/017 345/8 |
| 2023/0209681 A1* | 6/2023 | Ackermann | H05K 1/0256 315/219 |
| 2023/0258946 A1* | 8/2023 | Palakollu | G02B 27/0093 345/8 |
| 2024/0069363 A1* | 2/2024 | Caspari | A45C 11/04 |

\* cited by examiner

| PMIC | PBS State | GPIO_Master | GPIO_Slave | GPIO_ACK_READ |
|---|---|---|---|---|
| Master | DVDD_CFG, POFF and FAULT | Disabled (No internal PU/PD) | | Disabled (No internal PU/PD) |
| Master | PON | Disabled (No internal PU/PD) | | Input Mode (No internal PU/PD) |
| Slave | DVDD_CFG, PON, POFF and FAULT | | Disabled (No internal PU/PD) | |

FIG. 17

| Function | Controlling Entity | GPIO_Master | GPIO_Slave | GPIO_ACK_READ | Comments |
|---|---|---|---|---|---|
| Co-processor triggered SHDN of Slave PMIC | Co-processor (Local SPMI) | Disabled (No internal PU/PD) | Configured to Open drain (No internal PU/PD) -> Stays asserted until Slave PMIC self-triggers S2 SHDN | Input Mode | Master SoC will receive any interrupt |

FIG. 18

| Function | Controlling PMIC | GPIO_Master | GPIO_Slave | GPIO_ACK_READ | Comments |
|---|---|---|---|---|---|
| PON Trigger to Slave PMIC | Master | Configure to Open drain (No internal PU/PD) -> Assert GPIO for 10ms -> Deassert GPIO -> Configure back to Disabled state | Disabled (No internal PU/PD) | Configure to Input Mode (No internal PU/PD) | |
| Success ACK (Slave ->Master) | Slave | Disabled (No internal PU/PD) | Disabled (No internal PU/PD) | Input Mode | Master SoC will not receive any interrupt. Assumes Slave PMIC is healthy |
| Failure ACK (Slave ->Master) | Slave | Disabled (No internal PU/PD) | Executed in Fault & OCP Sequence of slave PMIC. Configure to Open drain (No internal PU/PD) -> Assert GPIO for 1ms (to trigger IRQ to Master SoC) -> Deassert GPIO -> Configure back to Disabled state | Input Mode | Master SoC will receive interrupt indicating Error in Slave PMIC |
| Slave PMIC SSR | Master | Configure to Open drain (No internal PU/PD) -> Assert GPIO for >S2 timer (20ms) -> Deassert GPIO -> Configure back to Disabled state | Disabled (No internal PU/PD) | Input Mode | Master SoC will receive an interrupt but ignored (since Master SoC is itselfasserting SSR) |
| Slave PMIC S3 | Master | Configure to Open drain (No internal PU/PD) -> Assert GPIO for > S3 timer -> Deassert GPIO -> Configure back to Disabled state | Disabled (No internal PU/PD) | Input Mode | Master SoC will receive an interrupt but ignored (since Master SoC is itself asserting S3 Reset) |

*FIG. 19*

INTERFACE FOR INTEGRATING PHYSICALLY DISTANT PRINTED CIRCUIT BOARDS (PCBS) IN A WEARABLE DEVICE

FIELD OF THE DISCLOSURE

The present disclosure relates generally to processing systems and, more particularly to an interface for integrating modules, or printed circuit boards (PCBs), that are located physically distant from one another.

BACKGROUND

Augmented reality (AR) merges the real world with virtual objects to support realistic, intelligent, and personalized experiences. Conventional augmented reality applications provide a live view of a real-world environment whose elements may be augmented by computer-generated sensory input such as video, sound, graphics or GPS data. With such applications, a view of reality may be modified by a computing device, to enhance a user's perception of reality and provide more information about the user's environment. Virtual reality simulates physical presence in real or imagined worlds, and enables the user to interact in that world. Realizing AR and VR requires the next level of artificial intelligence (AI), and connectivity within the thermal and power envelope of wearable glasses.

SUMMARY

Aspects of the present disclosure are directed to an apparatus. The apparatus comprises a first printed circuit board (PCB) supporting a master subsystem including a master power management integrated circuit (PMIC) coupled to a master processor via a first local interface. The apparatus also comprises a second PCB supporting a slave subsystem including a slave PMIC coupled to a slave processor via a second local interface. The apparatus further comprises a first bi-directional control interface coupling the master processor to the master PMIC and to the slave PMIC. The first bi-directional control interface comprises at least one trace overloaded to carry multiple PMIC functions.

In other aspects of the present disclosure, a method for integrating systems on separate printed circuit boards (PCBs) includes transmitting a power on signal from a master subsystem on a first PCB to a slave subsystem on a second PCB over a bi-directional control interface. The control interface comprises at least one trace overloaded to carry a number of power management integrated circuit (PMIC) functions. The method also includes transmitting a shutdown signal from the master subsystem to the slave subsystem over the control interface. The method further includes transmitting a fail-safe reset signal from the master subsystem to the slave subsystem over the control interface.

Other aspects of the present disclosure are directed to an apparatus. The apparatus includes means for transmitting a power on signal from a master subsystem on a first PCB to a slave subsystem on a second PCB over a bi-directional control interface. The control interface comprises at least one trace overloaded to carry a number of PMIC functions. The apparatus also includes means for transmitting a shutdown signal from the master subsystem to the slave subsystem over the control interface. The apparatus further includes means for transmitting a fail-safe reset signal from the master subsystem to the slave subsystem over the control interface.

In other aspects of the present disclosure, a non-transitory computer-readable medium with program code recorded thereon is disclosed. The program code is executed by a processor and includes program code to transmit a power on signal from a master subsystem on a first PCB to a slave subsystem on a second PCB over a bi-directional control interface. The control interface comprises at least one trace overloaded to carry a number of PMIC functions. The program code also includes program code to transmit a shutdown signal from the master subsystem to the slave subsystem over the control interface. The program code further includes program code to transmit a fail-safe reset signal from the master subsystem to the slave subsystem over the control interface.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF DRAWINGS

The details of one or more examples of the disclosure are set forth in the accompanying drawings and the description below. Other features, objects, and advantages of the disclosure will be apparent from the description and drawings, and from the claims.

FIG. 17 is a table illustrating general purpose input and output (GPIO) pin configurations for master and slave power management integrated circuits (PMICs) in various power on states, in accordance with aspects of the present disclosure.

FIG. 18 is a table illustrating pin configurations for slave system-on-a-chip (SoC) triggering of shutdown of a slave PMIC, in accordance with aspects of the present disclosure.

FIG. 19 is a table illustrating general purpose input or output (GPIO) pin configurations for controlling a slave PMIC, in accordance with aspects of the present disclosure.

DETAILED DESCRIPTION

Figure 1:
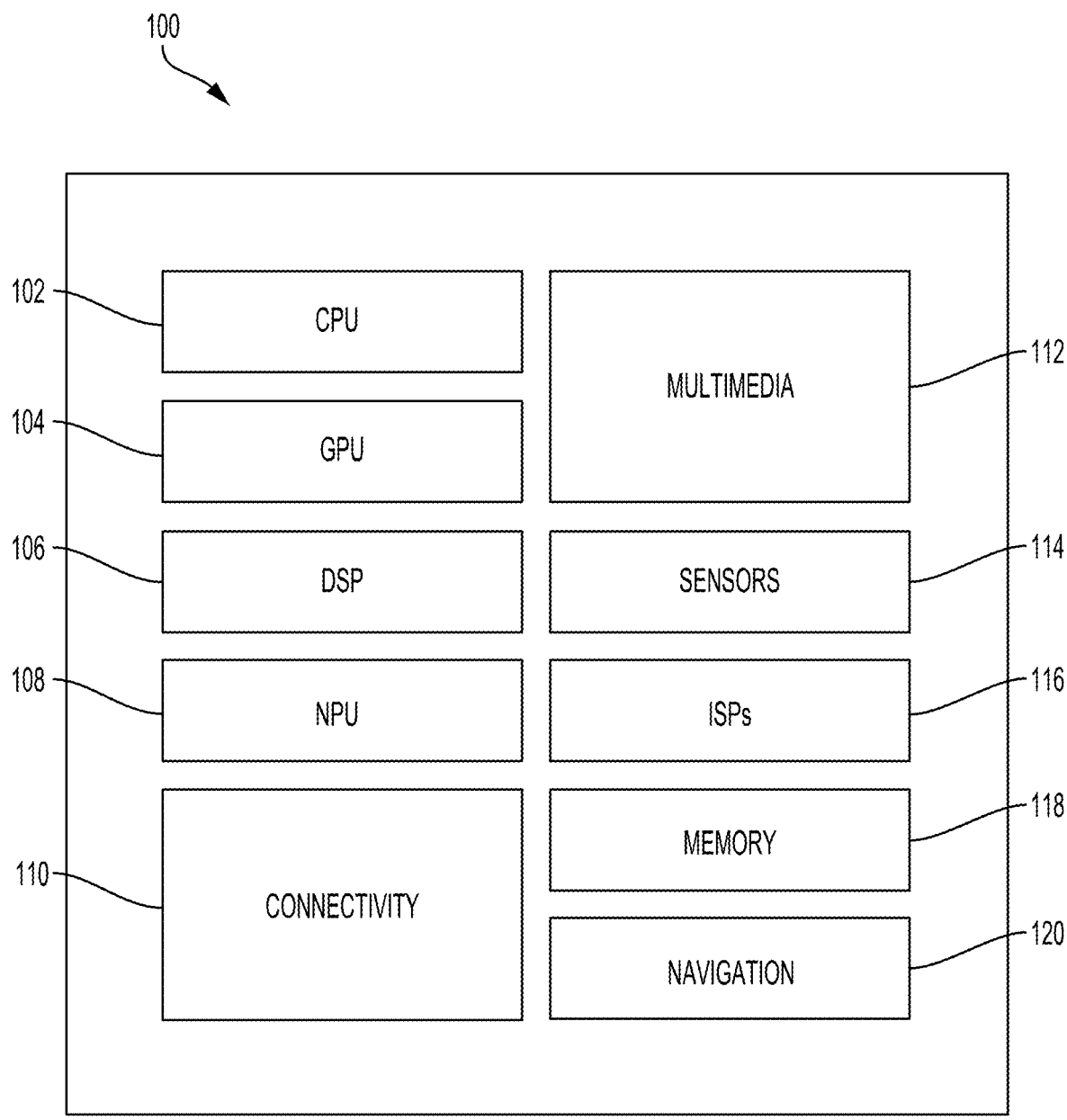
FIG. 1 illustrates an example implementation of a system-on-a-chip (SoC).

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings one skilled in the art should appreciate that the scope of this disclosure is intended to cover any aspect of the systems, apparatuses, computer program products, and methods disclosed, whether implemented independently of, or combined with, other aspects of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. Any aspect disclosed may be embodied by one or more elements of a claim.

Although various aspects are described, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, system-on-a-chips (SoCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described, one or more techniques may refer to an application (e.g., software) being configured to perform one or more functions. In such examples, the application may be stored on a memory (e.g., on-chip memory of a processor, system memory, or any other memory). Hardware described, such as a processor may be configured to execute the application. For example, the application may be described as including code that, when executed by the hardware, causes the hardware to perform one or more techniques described. As an example, the hardware may access the code from a memory and executed the code accessed from the memory to perform one or more techniques described. In some examples, components are identified in this disclosure. In such examples, the components may be hardware, software, or a combination thereof. The components may be separate components or sub-components of a single component.

Accordingly, in one or more examples described, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for integrating subsystems or modules that are located on physically separated printed circuit boards (PCBs). For example augmented reality or virtual reality (AR/VR) devices may have modules located physically distant from one another. However, the present disclosure is equally applicable to any type of system with modules or PCBs spaced apart but electrically connected (e.g., with a flex cable, a flex PCB, a coaxial cable, a rigid PCB, etc.) In some aspects, the solutions integrate at least one slave subsystem with a master subsystem by implementing all control and status monitor functions between the subsystems. For example, certain bi-directional functions may be implemented between master and slave subsystems, such as power on triggers, reset triggers, shutdown triggers, fault propagation, and fail-safe reset triggers.

As used, the term "coder" may generically refer to an encoder and/or decoder. For example, reference to a "content coder" may include reference to a content encoder and/or a content decoder. Similarly, as used, the term "coding" may generically refer to encoding and/or decoding. As used, the terms "encode" and "compress" may be used interchangeably. Similarly, the terms "decode" and "decompress" may be used interchangeably.

As used, instances of the term "content" may refer to the term "video," "graphical content," "image," and vice versa. This is true regardless of whether the terms are being used as an adjective, noun, or other part of speech. For example, reference to a "content coder" may include reference to a "video coder," "graphical content coder," or "image coder," and reference to a "video coder," "graphical content coder," or "image coder" may include reference to a "content coder." As another example, reference to a processing unit providing content to a content coder may include reference to the processing unit providing graphical content to a video encoder. In some examples, the term "graphical content" may refer to a content produced by one or more processes of a graphics processing pipeline. In some examples, the term "graphical content" may refer to a content produced by a processing unit configured to perform graphics processing. In some examples, the term "graphical content" may refer to a content produced by a graphics processing unit.

Instances of the term "content" may refer to graphical content or display content. In some examples, the term "graphical content" may refer to a content generated by a processing unit configured to perform graphics processing. For example, the term "graphical content" may refer to content generated by one or more processes of a graphics processing pipeline. In some examples, the term "graphical content" may refer to content generated by a graphics processing unit. In some examples, as used herein, the term "display content" may refer to content generated by a processing unit configured to perform displaying processing. In some examples, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (e.g., the frame includes two or more layers, and the frame that includes two or more layers may subsequently be blended)

As referenced, a first component (e.g., a processing unit) may provide content, such as graphical content, to a second component (e.g., a content coder). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

For a mobile device, such as a mobile telephone, a single printed circuit board (PCB) may support multiple components including a CPU, GPU, DSP, etc. For an augmented reality (AR) or virtual reality (VR) device, the components may be located on different PCBs due to the form factor of the AR or VR device. For example, the AR or VR device may be in the form of eyeglasses. In an example implementation, a main SoC (also referred to as a main processor) and a main power management integrated circuit (PMIC) may reside on a first PCB in one of the arms of the eyeglasses. A camera and sensor co-processor and associated PMIC may reside on a second PCB near the bridge of the eyeglasses. A connectivity processor and associated PMIC may reside on a third PCB on the other arm of the eyeglasses. The main SoC and main PMIC are referred to as a master SoC (also referred to as a master processor) and a master PMIC. The camera and sensor co-processor and associated PMIC, as well as the connectivity processor and associated PMIC may be referred to as slave SoCs and slave PMICs.

Due to the separate locations of the PCBs, the length of connectors between the PCBs may exceed design specifications. Moreover, the connectors may be arranged in a multi-drop configuration, which also impedes performance due to stubs and reflections. Flexible PCBs may also be used between PCBs, which may further impact signal integrity.

There is a need for a new solution for inter-PCB PMIC communication, for example, over lengthy and lossy flex cables.

Aspects of the disclosure introduce solutions for inter-PCB PMIC communication for small form factor devices. In some aspects, the solutions integrate at least one slave subsystem with a master subsystem by implementing all control and status monitor functions between the subsystems. For example, certain bi-directional functions may be implemented between master and slave subsystems. According to aspects of the present disclosure, a bi-directional, asynchronous, half duplex, single-wire control interface is introduced for master-slave PMICs. The control interface may have applicability in VR and AR applications, for example, or any application involving separated PCBs. Integration of slave subsystems with a master subsystem through the single wire interface meets specifications for improved or even optimal interconnectivity in AR and VR applications. Control functions implemented over the single wire interface may include a power on trigger, master island fault propagation, a fail-safe reset trigger, slave status acknowledgment, and slave processor induced graceful shutdown (SHDN) of a slave PMIC.

Particular aspects of the subject matter described in this disclosure can be implemented to realize one or more of the following potential advantages. In some examples, the described techniques, such as multiplexing control signals over a reduced number of interfaces between separate PCBs enables integration of a multi-PCB architecture for AR and VR applications. Hence this solution may be used in sleek form factor AR and VR designs. The inter-PCB control interface eliminates multi-drop star routed messaging across PCBs that would result in huge debug cycles and field returns. The inter-PCB control interface enables a subsystem reset feature that improves debuggability and recovery of the system by localizing any issue to the subsystem, and thus offers an improved user experience. The inter-PCB control interface is a low latency interface that enables fast boot and fast recovery.

FIG. 1 illustrates an example implementation of a system-on-a-chip (SoC) 100 on a single printed circuit board (PCB). The host SoC 100 includes processing blocks tailored to specific functions, such as a connectivity block 110. The connectivity block 110 may include fifth generation (5G) new radio (NR) connectivity, fourth generation long term evolution (4G LTE) connectivity, Wi-Fi connectivity, USB connectivity, Bluetooth® connectivity, Secure Digital (SD) connectivity, and the like.

In this configuration, the SoC 100 includes various processing units that support multi-threaded operation. For the configuration shown in FIG. 1, the SoC 100 includes a multi-core central processing unit (CPU) 102, a graphics processor unit (GPU) 104, a digital signal processor (DSP) 106, and a neural processor unit (NPU) 108. The SoC 100 may also include a sensor processor 114, image signal processors (ISPs) 116, a navigation module 120, which may include a global positioning system, and a memory 118. The multi-core CPU 102, the GPU 104, the DSP 106, the NPU 108, and the multi-media engine 112 support various functions such as video, audio, graphics, extended reality (XR) gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set.

Figure 2:
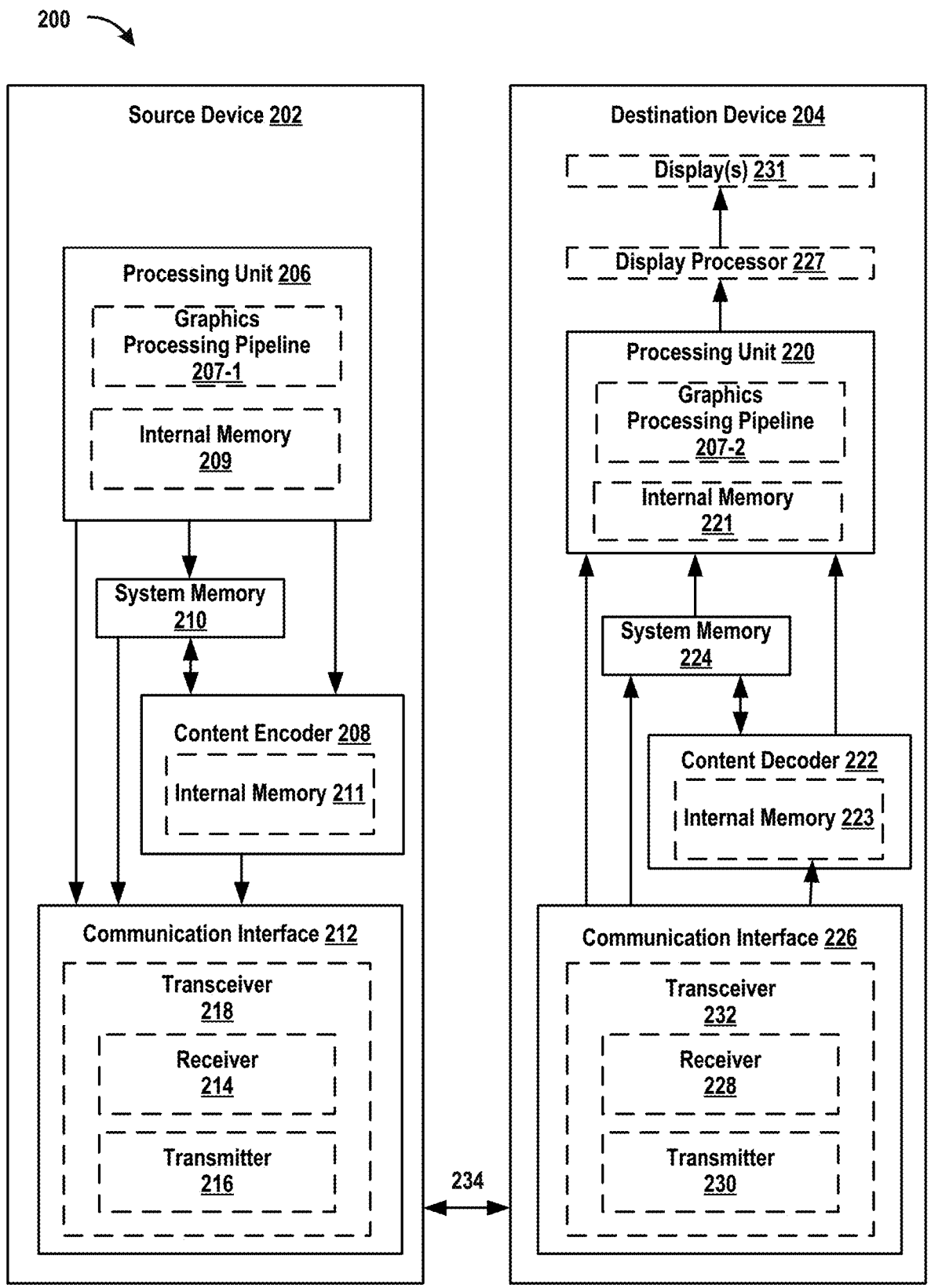
FIG. 2 is a block diagram that illustrates an example content generation and coding system to implement extended reality (XR) or virtual reality (VR) applications, in accordance with aspects of the present disclosure.

FIG. 2 is a block diagram that illustrates an example extended reality (XR) or virtual reality (VR) system 200 configured to implement extended reality (XR) or VR applications, according to aspects of the present disclosure. The system 200 includes a source device 202 and a destination device 204. In accordance with the techniques described, the source device 202 may be configured to encode, using the content encoder 208, graphical content generated by the processing unit 206 prior to transmission to the destination device 204. The content encoder 208 may be configured to output a bitstream having a bit rate. The processing unit 206 may be configured to control and/or influence the bit rate of the content encoder 208 based on how the processing unit 206 generates graphical content.

The source device 202 may include one or more components (or circuits) for performing various functions described herein. The destination device 204 may include one or more components (or circuits) for performing various functions described herein. In some examples, one or more components of the source device 202 may be components of a system-on-a-chip (SoC). Similarly, in some examples, one or more components of the destination device 204 may be components of an SoC.

The source device 202 may include one or more components configured to perform one or more techniques of this disclosure. In the example shown, the source device 202 may include a processing unit 206, a content encoder 208, a system memory 210, and a communication interface 212. The processing unit 206 may include an internal memory 209. The processing unit 206 may be configured to perform graphics processing, such as in a graphics processing pipeline 207-1. The content encoder 208 may include an internal memory 211.

Memory external to the processing unit 206 and the content encoder 208, such as system memory 210, may be accessible to the processing unit 206 and the content encoder 208. For example, the processing unit 206 and the content encoder 208 may be configured to read from and/or write to external memory, such as the system memory 210. The processing unit 206 and the content encoder 208 may be communicatively coupled to the system memory 210 over a bus. In some examples, the processing unit 206 and the content encoder 208 may be communicatively coupled to each other over the bus or a different connection.

The content encoder 208 may be configured to receive graphical content from any source, such as the system memory 210 and/or the processing unit 206. The system memory 210 may be configured to store graphical content generated by the processing unit 206. For example, the processing unit 206 may be configured to store graphical content in the system memory 210. The content encoder 208 may be configured to receive graphical content (e.g., from the system memory 210 and/or the processing unit 206) in the form of pixel data. Otherwise described, the content encoder 208 may be configured to receive pixel data of graphical content produced by the processing unit 206. For example, the content encoder 208 may be configured to receive a value for each component (e.g., each color component) of one or more pixels of graphical content. As an example, a pixel in the red, green, blue (RGB) color space may include a first value for the red component, a second value for the green component, and a third value for the blue component.

The internal memory 209, the system memory 210, and/or the internal memory 211 may include one or more volatile or non-volatile memories or storage devices. In some examples, internal memory 209, the system memory 210, and/or the internal memory 211 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 209, the system memory 210, and/or the internal memory 211 may be a non-transitory storage medium according to some examples. The term "non-transitory" may indicate that the storage medium is not embodied in a carrier wave or a propagated signal. However, the term "non-transitory" should not be interpreted to mean that internal memory 209, the system memory 210, and/or the internal memory 211 is non-movable or that its contents are static. As one example, the system memory 210 may be removed from the source device 202 and moved to another device. As another example, the system memory 210 may not be removable from the source device 202.

The processing unit 206 may be a central processing unit (CPU), a graphics processing unit (GPU), a general purpose GPU (GPGPU), or any other processing unit that may be configured to perform graphics processing. In some examples, the processing unit 206 may be integrated into a motherboard of the source device 202. In some examples, the processing unit 206 may be present on a graphics card that is installed in a port in a motherboard of the source device 202, or may be otherwise incorporated within a peripheral device configured to interoperate with the source device 202.

The processing unit 206 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 206 may store instructions for the software in a suitable, non-transitory computer-readable storage medium (e.g., internal memory 209), and may execute the instructions in hardware using one or more processors to perform the techniques of this disclosure. Any of the foregoing (including hardware, software, a combination of hardware and software, etc.) may be considered to be one or more processors.

The content encoder 208 may be any processing unit configured to perform content encoding. In some examples, the content encoder 208 may be integrated into a motherboard of the source device 202. The content encoder 208 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content encoder 208 may store instructions for the software in a suitable, non-transitory computer-readable storage medium (e.g., internal memory 211), and may execute the instructions in hardware using one or more processors to perform the techniques of this disclosure. Any of the foregoing (including hardware, software, a combination of hardware and software, etc.) may be considered to be one or more processors.

The communication interface 212 may include a receiver 214 and a transmitter 216. The receiver 214 may be configured to perform any receiving function described herein with respect to the source device 202. For example, the receiver 214 may be configured to receive information from the destination device 204, which may include a request for content. In some examples, in response to receiving the request for content, the source device 202 may be configured to perform one or more techniques described herein, such as produce or otherwise generate graphical content for delivery to the destination device 204. The transmitter 216 may be configured to perform any transmitting function described herein with respect to the source device 202. For example, the transmitter 216 may be configured to transmit encoded content to the destination device 204, such as encoded graphical content produced by the processing unit 206 and the content encoder 208 (e.g., the graphical content is produced by the processing unit 206, which the content encoder 208 receives as input to produce or otherwise generate the encoded graphical content). The receiver 214 and the transmitter 216 may be combined into a transceiver 218. In such examples, the transceiver 218 may be configured to perform any receiving function and/or transmitting function described herein with respect to the source device 202.

The destination device 204 may include one or more components configured to perform one or more techniques of this disclosure. In the example shown, the destination device 204 may include a processing unit 220, a content decoder 222, a system memory 224, a communication interface 226, and one or more displays 231. Reference to the displays 231 may refer to the one or more displays 231. For example, the displays 231 may include a single display or a plurality of displays. The displays 231 may include a first display and a second display. The first display may be a left-eye display and the second display may be a right-eye display. In some examples, the first and second display may receive different frames for presentment thereon. In other examples, the first and second display may receive the same frames for presentment thereon.

The processing unit 220 may include an internal memory 221. The processing unit 220 may be configured to perform graphics processing, such as in a graphics processing pipeline 207-2. The content decoder 222 may include an internal memory 223. In some examples, the destination device 204 may include a display processor, such as the display processor 227, to perform one or more display processing techniques on one or more frames generated by the processing unit 220 before presentment by the one or more displays 231. The display processor 227 may be configured to perform display processing. For example, the display processor 227 may be configured to perform one or more display processing techniques on one or more frames generated by the processing unit 220. The one or more displays 231 may be configured to display content that was generated using decoded content. For example, the display processor 227 may be configured to process one or more frames generated by the processing unit 220, where the one or more frames are generated by the processing unit 220 by using decoded content that was derived from encoded content received from the source device 202. In turn the display processor 227 may be configured to perform display processing on the one or more frames generated by the processing unit 220. The one or more displays 231 may be configured to display or otherwise present frames processed by the display processor 227. In some examples, the one or more display devices may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 220 and the content decoder 222, such as system memory 224, may be accessible to the processing unit 220 and the content decoder 222. For example, the processing unit 220 and the content decoder 222 may be configured to read from and/or write to external memory, such as the system memory 224. The processing unit 220 and the content decoder 222 may be communicatively coupled to the system memory 224 over a bus. In some examples, the processing unit 220 and the content decoder 222 may be communicatively coupled to each other over the bus or a different connection.

The content decoder 222 may be configured to receive graphical content from any source, such as the system memory 224 and/or the communication interface 226. The system memory 224 may be configured to store received encoded graphical content, such as encoded graphical content received from the source device 202. The content decoder 222 may be configured to receive encoded graphical content (e.g., from the system memory 224 and/or the communication interface 226) in the form of encoded pixel data. The content decoder 222 may be configured to decode encoded graphical content.

The internal memory 221, the system memory 224, and/or the internal memory 223 may include one or more volatile or non-volatile memories or storage devices. In some examples, internal memory 221, the system memory 224, and/or the internal memory 223 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 221, the system memory 224, and/or the internal memory 223 may be a non-transitory storage medium according to some examples. The term "non-transitory" may indicate that the storage medium is not embodied in a carrier wave or a propagated signal. However, the term "non-transitory" should not be interpreted to mean that internal memory 221, the system memory 224, and/or the internal memory 223 is non-movable or that its contents are static. As one example, the system memory 224 may be removed from the destination device 204 and moved to another device. As another example, the system memory 224 may not be removable from the destination device 204.

The processing unit 220 may be a central processing unit (CPU), a graphics processing unit (GPU), a general purpose GPU (GPGPU), or any other processing unit that may be configured to perform graphics processing. In some examples, the processing unit 220 may be integrated into a motherboard of the destination device 204. In some examples, the processing unit 220 may be present on a graphics card that is installed in a port in a motherboard of the destination device 204, or may be otherwise incorporated within a peripheral device configured to interoperate with the destination device 204.

The processing unit 220 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 220 may store instructions for the software in a suitable, non-transitory computer-readable storage medium (e.g., internal memory 221), and may execute the instructions in hardware using one or more processors to perform the techniques of this disclosure. Any of the foregoing (including hardware, software, a combination of hardware and software, etc.) may be considered to be one or more processors.

The content decoder 222 may be any processing unit configured to perform content decoding. In some examples, the content decoder 222 may be integrated into a motherboard of the destination device 204. The content decoder 222 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content decoder 222 may store instructions for the software in a suitable, non-transitory computer-readable storage medium (e.g., internal memory 223), and may execute the instructions in hardware using one or more processors to perform the techniques of this disclosure. Any of the foregoing (including hardware, software, a combination of hardware and software, etc.) may be considered to be one or more processors.

The communication interface 226 may include a receiver 228 and a transmitter 230. The receiver 228 may be configured to perform any receiving function described herein with respect to the destination device 204. For example, the receiver 228 may be configured to receive information from the source device 202, which may include encoded content, such as encoded graphical content produced or otherwise generated by the processing unit 206 and the content encoder 208 of the source device 202 (e.g., the graphical content is produced by the processing unit 206, which the content encoder 208 receives as input to produce or otherwise generate the encoded graphical content). As another example, the receiver 228 may be configured to receive position information from the source device 202, which may be encoded or unencoded (e.g., not encoded). In some examples, the destination device 204 may be configured to decode encoded graphical content received from the source device 202 in accordance with the techniques described herein. For example, the content decoder 222 may be configured to decode encoded graphical content to produce or otherwise generate decoded graphical content. The processing unit 220 may be configured to use the decoded graphical content to produce or otherwise generate one or more frames for presentment on the one or more displays 231. The transmitter 230 may be configured to perform any transmitting function described herein with respect to the destination device 204. For example, the transmitter 230 may be configured to transmit information to the source device 202, which may include a request for content. The receiver 228 and the transmitter 230 may be combined into a transceiver 232. In such examples, the transceiver 232 may be configured to perform any receiving function and/or transmitting function described herein with respect to the destination device 204.

The content encoder 208 and the content decoder 222 of XR gaming system 200 represent examples of computing components (e.g., processing units) that may be configured to perform one or more techniques for encoding content and decoding content in accordance with various examples described in this disclosure, respectively. In some examples, the content encoder 208 and the content decoder 222 may be configured to operate in accordance with a content coding standard, such as a video coding standard, a display stream compression standard, or an image compression standard.

As shown in FIG. 2, the source device 202 may be configured to generate encoded content. Accordingly, the source device 202 may be referred to as a content encoding device or a content encoding apparatus. The destination device 204 may be configured to decode the encoded content generated by source device 202. Accordingly, the destination device 204 may be referred to as a content decoding device or a content decoding apparatus. In some examples, the source device 202 and the destination device 204 may be separate devices, as shown. In other examples, source device 202 and destination device 204 may be on or part of the same computing device. In either example, a graphics processing pipeline may be distributed between the two devices. For example, a single graphics processing pipeline may include a plurality of graphics processes. The graphics processing pipeline 207-1 may include one or more graphics processes of the plurality of graphics processes. Similarly, graphics processing pipeline 207-2 may include one or more processes graphics processes of the plurality of graphics processes. In this regard, the graphics processing pipeline 207-1 concatenated or otherwise followed by the graphics processing pipeline 207-2 may result in a full graphics processing pipeline. Otherwise described, the graphics processing pipeline 207-1 may be a partial graphics processing pipeline and the graphics processing pipeline 207-2 may be a partial graphics processing pipeline that, when combined, result in a distributed graphics processing pipeline.

In some examples, a graphics process performed in the graphics processing pipeline 207-1 may not be performed or otherwise repeated in the graphics processing pipeline 207-2. For example, the graphics processing pipeline 207-1 may include receiving first position information corresponding to a first orientation of a device. The graphics processing pipeline 207-1 may also include generating first graphical content based on the first position information. Additionally, the graphics processing pipeline 207-1 may include generating motion information for warping the first graphical content. The graphics processing pipeline 207-1 may further include encoding the first graphical content. Also, the graphics processing pipeline 207-1 may include providing the motion information and the encoded first graphical content. The graphics processing pipeline 207-2 may include providing first position information corresponding to a first orientation of a device. The graphics processing pipeline 207-2 may also include receiving encoded first graphical content generated based on the first position information. Further, the graphics processing pipeline 207-2 may include receiving motion information. The graphics processing pipeline 207-2 may also include decoding the encoded first graphical content to generate decoded first graphical content. Also, the graphics processing pipeline 207-2 may include warping the decoded first graphical content based on the motion information. By distributing the graphics processing pipeline between the source device 202 and the destination device 204, the destination device may be able to, in some examples, present graphical content that it otherwise would not be able to render; and, therefore, could not present. Other example benefits are described throughout this disclosure.

As described, a device, such as the source device 202 and/or the destination device 204, may refer to any device, apparatus, or system configured to perform one or more techniques described. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, an augmented reality device, a virtual reality device, a display (e.g., display device), a television, a television set-top box, an intermediate network device, a digital media player, a video streaming device, a content streaming device, an in-car computer, any mobile device, any device configured to generate graphical content, or any device configured to perform one or more techniques described herein.

Source device 202 may be configured to communicate with the destination device 204. For example, destination device 204 may be configured to receive encoded content from the source device 202. In some example, the communication coupling between the source device 202 and the destination device 204 is shown as link 234. Link 234 may comprise any type of medium or device capable of moving the encoded content from source device 202 to the destination device 204.

In the example of FIG. 2, link 234 may comprise a communication medium to enable the source device 202 to transmit encoded content to destination device 204 in real-time. The encoded content may be modulated according to a communication standard, such as a wireless communication protocol, and transmitted to destination device 204. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 202 to the destination device 204. In other examples, link 234 may be a point-to-point connection between source device 202 and destination device 204, such as a wired or wireless display link connection (e.g., a high-definition multimedia interface (HDMI) link, a DisplayPort link, mobile industry processor interface (MIPI) display serial interface (DSI) link, or another link over which encoded content may traverse from the source device 202 to the destination device 204.

In another example, the link 234 may include a storage medium configured to store encoded content generated by the source device 202. In this example, the destination device 204 may be configured to access the storage medium. The storage medium may include a variety of locally-accessed data storage media such as Blu-ray discs, DVDs, CD-ROMs, flash memory, or other suitable digital storage media for storing encoded content.

In another example, the link 234 may include a server or another intermediate storage device configured to store encoded content generated by the source device 202. In this example, the destination device 204 may be configured to access encoded content stored at the server or other intermediate storage device. The server may be a type of server capable of storing encoded content and transmitting the encoded content to the destination device 204.

Devices described may be configured to communicate with each other, such as the source device 202 and the destination device 204. Communication may include the transmission and/or reception of information. The information may be carried in one or more messages. As an example, a first device in communication with a second device may be described as being communicatively coupled to or otherwise with the second device. For example, a client device and a server may be communicatively coupled. As another example, a server may be communicatively coupled to a plurality of client devices. As another example, any device described herein configured to perform one or more techniques of this disclosure may be communicatively coupled to one or more other devices configured to perform one or more techniques of this disclosure. In some examples, when communicatively coupled, two devices may be actively transmitting or receiving information, or may be configured to transmit or receive information. If not communicatively coupled, any two devices may be configured to communicatively couple with each other, such as in accordance with one or more communication protocols compliant with one or more communication standards. Reference to "any two devices" does not mean that only two devices may be configured to communicatively couple with each other; rather, any two devices are inclusive of more than two devices. For example, a first device may communicatively couple with a second device and the first device may communicatively couple with a third device. In such an example, the first device may be a server.

With reference to FIG. 2, the source device 202 may be described as being communicatively coupled to the destination device 204. In some examples, the term "communicatively coupled" may refer to a communication connection, which may be direct or indirect. The link 234 may, in some examples, represent a communication coupling between the source device 202 and the destination device 204. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. Two devices that are communicatively coupled may communicate with each other over one or more different types of networks (e.g., a wireless network and/or a wired network) in accordance with one or more communication protocols. In some examples, two devices that are communicatively coupled may associate with one another through an association process. In other examples, two devices that are communicatively coupled may communicate with each other without engaging in an association process. For example, a device, such as the source device 202, may be configured to unicast, broadcast, multicast, or otherwise transmit information (e.g., encoded content) to one or more other devices (e.g., one or more destination devices, which includes the destination device 204). The destination device 204 in this example may be described as being communicatively coupled with each of the one or more other devices. In some examples, a communication connection may enable the transmission and/or receipt of information. For example, a first device communicatively coupled to a second device may be configured to transmit information to the second device and/or receive information from the second device in accordance with the techniques of this disclosure. Similarly, the second device in this example may be configured to transmit information to the first device and/or receive information from the first device in accordance with the techniques of this disclosure. In some examples, the term "communicatively coupled" may refer to a temporary, intermittent, or permanent communication connection.

Any device described, such as the source device 202 and the destination device 204, may be configured to operate in accordance with one or more communication protocols. For example, the source device 202 may be configured to communicate with (e.g., receive information from and/or transmit information to) the destination device 204 using one or more communication protocols. In such an example, the source device 202 may be described as communicating with the destination device 204 over a connection. The connection may be compliant or otherwise be in accordance with a communication protocol. Similarly, the destination device 204 may be configured to communicate with (e.g., receive information from and/or transmit information to) the source device 202 using one or more communication protocols. In such an example, the destination device 204 may be described as communicating with the source device 202 over a connection. The connection may be compliant or otherwise be in accordance with a communication protocol.

The term "communication protocol" may refer to any communication protocol, such as a communication protocol compliant with a communication standard or the like. As used herein, the term "communication standard" may include any communication standard, such as a wireless communication standard and/or a wired communication standard. A wireless communication standard may correspond to a wireless network. As an example, a communication standard may include any wireless communication standard corresponding to a wireless personal area network (WPAN) standard, such as Bluetooth (e.g., IEEE 802.15), Bluetooth low energy (BLE) (e.g., IEEE 802.15.4). As another example, a communication standard may include any wireless communication standard corresponding to a wireless local area network (WLAN) standard, such as WI-FI (e.g., any 802.11 standard, such as 802.11a, 802.11b, 802.11c, 802.11n, or 802.11ax). As another example, a communication standard may include any wireless communication standard corresponding to a wireless wide area network (WWAN) standard, such as 3G, 4G, 4G LTE, 5G, or 6G.

With reference to FIG. 2, the content encoder 208 may be configured to encode graphical content. In some examples, the content encoder 208 may be configured to encode graphical content as one or more video frames of extended reality (XR) or virtual reality (VR) content. When the content encoder 208 encodes content, the content encoder 208 may generate a bitstream. The bitstream may have a bit rate, such as bits/time unit, where time unit is any time unit, such as second or minute. The bitstream may include a sequence of bits that form a coded representation of the graphical content and associated data. To generate the bitstream, the content encoder 208 may be configured to perform encoding operations on pixel data, such as pixel data corresponding to a shaded texture atlas. For example, when the content encoder 208 performs encoding operations on image data (e.g., one or more blocks of a shaded texture atlas) provided as input to the content encoder 208, the content encoder 208 may generate a series of coded images and associated data. The associated data may include a set of coding parameters such as a quantization parameter (QP).

Figure 3:
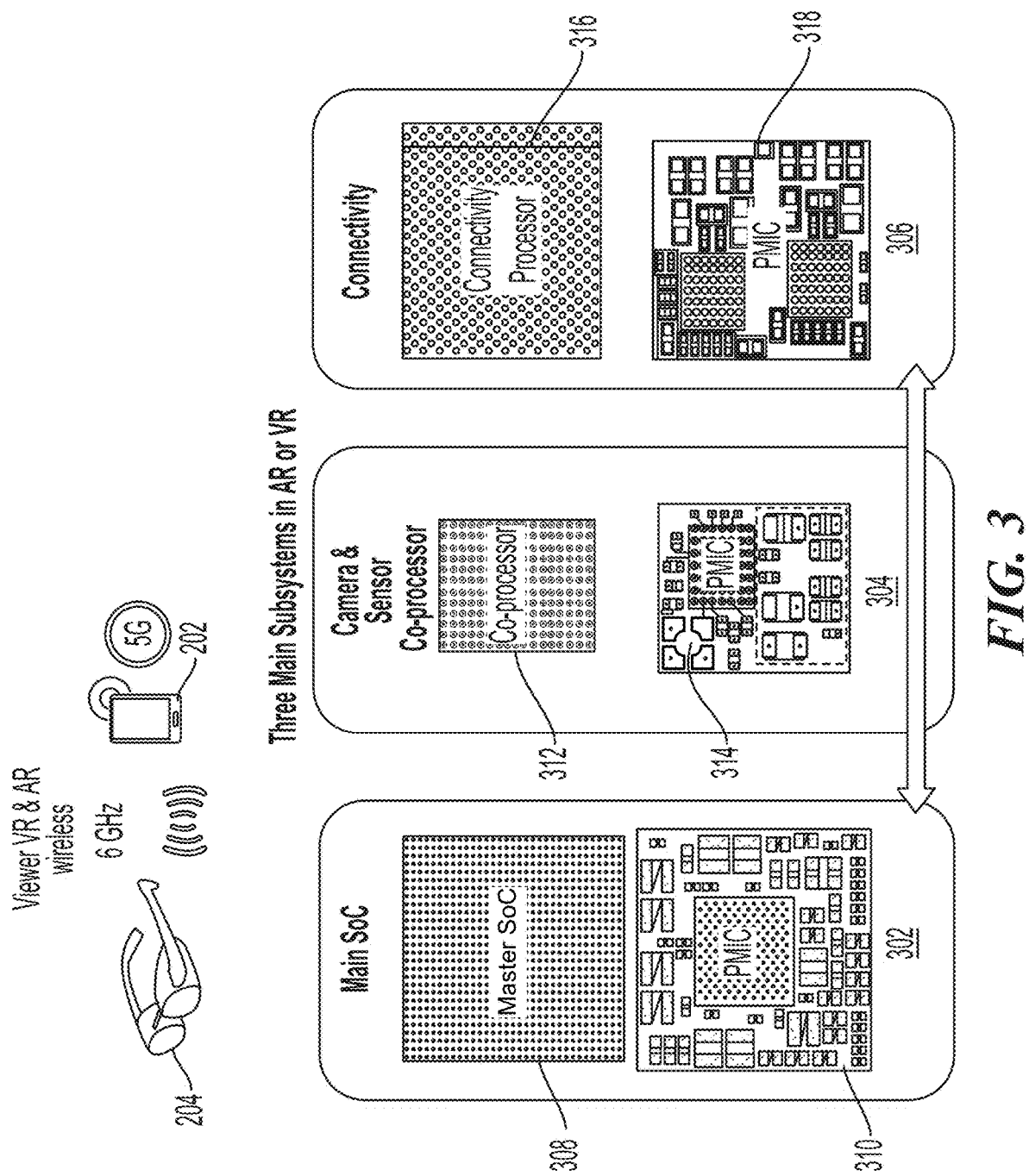
FIG. 3 is a block diagram illustrating augmented reality or virtual reality subsystems, according to aspects of the present disclosure.

As shown in FIG. 1, a single PCB may support multiple components of the SoC 100, including the CPU 102, GPU 104, DSP 106, etc. For an AR or VR device, the components may be located on different PCBs. FIG. 3 is a block diagram illustrating augmented reality or virtual reality subsystems, according to aspects of the present disclosure. As seen in the example of FIG. 3, the destination device 204 may be in the form of eyeglasses and the source device 202 may be in the form of a mobile device. If the destination device 204 has an eyeglasses form factor, the various components may be distributed across multiple PCBs 302, 304, 306 in a multi PCB architecture. For example, a master SoC 308 and a master power management integrated circuit (PMIC) 310 may reside on a first PCB 302, a camera and sensor co-processor 312 and associated PMIC 314 may reside on a second PCB 304, and a connectivity processor 316 and associated PMIC 318 may reside on a third PCB 306. Due to the separate locations of the PCBs 302, 304, 306, the length of connectors between the PCBs 302, 304, 306 may exceed design specifications. Moreover, the connectors may be arranged in a multi-drop configuration, which also impedes performance due to stubs and reflections. Flexible PCBs may also be used between PCBs 302, 304, 306, which may further impact signal integrity.

Figure 4:
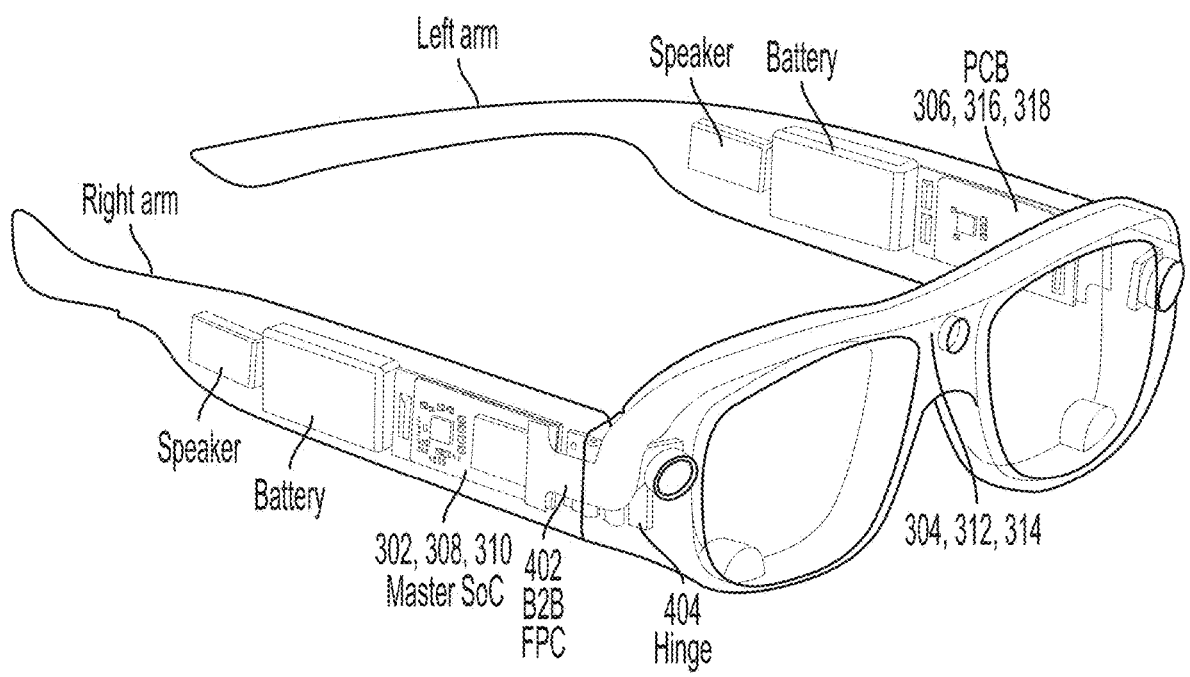
FIG. 4 is a diagram illustrating locations of components in a device with an eyeglasses form factor, in accordance with various aspects of the present disclosure.

FIG. 4 is a diagram illustrating placement of components in a device with an eyeglasses form factor, in accordance with aspects of the present disclosure. As seen in the example of FIG. 4, the master SoC 308 and master power management IC (PMIC) 310 may reside on the first PCB 302 in one arm of the glasses, the camera and sensor co-processor 312 and associated PMIC 314 may reside on the second PCB 304 on the bridge of the eyeglasses, and the connectivity processor 316 and associated PMIC 318 may reside on the third PCB 306 on another arm of the glasses. Location of batteries and speakers are also shown in FIG. 4. A board-to-board (B2B) flexible printed circuit (FPC) connector 402 couples the first PCB 302, the second PCB 304, and the third PCB 306 across hinges 404 (only one labelled) of the eyeglasses.

Due to the small form factor of the device, small PCBs are provided, and thus there is small PCB area availability. Due to signals traveling across hinges, signal integrity may be affected. Moreover, the lengthy channels (e.g., up to 20 cm-25 cm from one arm to another arm of the eyeglasses) and channels on flex cables with high insertion loss may cause signal integrity issues for high-speed signals, such as system power management interface (SPMI) protocol signals. The small form factor of the eyeglasses specifies small board-to-board connectors. The small size places severe constraints on wires crossing hinges. For example, the number of signals able to be sent across hinges may be limited. Furthermore, the small volume of the eyeglasses frame constrains the trace thickness, limiting sharing of power rails across subsystems.

As seen in FIG. 3, each subsystem (e.g., 308, 312, 316) has its own PMIC (e.g., 310, 314, 318). The standard interface for PMIC communication is SPMI. For inter-PCB PMIC communication, however, SPMI is not a viable option due to the long connectivity traces and reflection stubs resulting from the PCBs being located apart from one another. Similarly, inter-integrated circuit (I2C) communications are not a viable solution. I2C is slow, is not scalable, and is expensive for connectivity across the hinges. Hence, there is a need for a new solution for inter-PCB PMIC communication, for example, over lengthy and lossy flex cables.

Aspects of the disclosure introduce solutions for inter-PCB PMIC communication for small form factor devices. In some aspects, the solutions integrate at least one slave subsystem with a master subsystem by implementing all control and status monitor functions between the subsystems. For example, certain bi-directional functions may be implemented between master and slave subsystems, such as power on triggers, reset triggers, shutdown triggers, fault propagation, and fail-safe reset triggers. A master subsystem may refer to the SoC and its PMIC. A slave subsystem may refer to a co-processor and its PMIC or a connectivity module/processor and its PMIC.

Power on triggers are controlled by a master SoC. The power on triggers may be sent to various slave PCBs that are time-independent or asynchronous to each other. For example, the master subsystem may turn on the camera and connectivity module at different times, depending on what is occurring.

A reset trigger enables a master SoC to trigger a subsystem reset, for example, if the slave PCB software is in a bad or unexpected state. The reset trigger may also enable recovery from a crash in the slave PCB software driver. The reset trigger may also log data, status registers, etc.

A shutdown trigger may be transmitted from the master SoC, in case of a system shutdown. The slave PCB may also transmit a shutdown trigger to a master PCB in case a fault is detected in the slave PCB, PMIC, or SoC.

Fault propagation allows a slave PCB to synchronize with the master PCB for any detected faults, to enable the master PCB to understand what is occurring at the slave PCB(s). The master SoC or PMIC always monitors slave PCBs for a bad state. Fault propagation enables the master PCB to act on faults or unexpected states of the slave subsystem.

The fail-safe reset trigger occurs when the master or slave software is hung or frozen. For example, if the master software is hung, it cannot communicate with the slave software. The hardware then enables a reset. The fail-safe reset also occurs in response to a user-forced reset.

In some aspects of the present disclosure, design risk is reduced by standardizing the interface between the master and the slave subsystems for scalability. For example, the interface may be "plug-and-play." A standard definition for the interface between master and slave subsystems allows a plug-and-play approach when attaching or detaching a slave. As such, aspects of the present disclosure introduce a well-defined and bounded signal or trace exchange between the master and slave subsystems. In some aspects, any number of slave PCBs may be attached, with a re-usable and standard way of attaching a slave subsystem to the master subsystem. The standardized interface reduces risk for architects or designers at the planning phase, and guarantees all necessary control functions between the master and slave subsystems.

In some aspects, a minimal or reduced number of traces is shared between the master and slave subsystems. Consequently, a minimal or reduced number of pins are provided on each slave and master subsystem to support all desired control functions.

In other aspects, the control interface is agnostic to signal integrity challenges. As such, no signal integrity requirements are defined allowing flexibility for architects and removing obstacles for physical placement. In these aspects, the signaling has relaxed requirements on rise and fall times. Signal exchanges are timing non-critical such that clock synchronization or dependency may be avoided.

In some aspects, costs for debugging are reduced, due to the enhanced visibility of the control flow between the master and slave subsystems. In still further aspects, the master subsystem has flexibility to independently control slave subsystems. Each slave state (e.g., active, OFF, or reset) may be controlled by the master subsystem asynchronously. The master is able to determine each slave state that is not simultaneous or concurrent to other slave states. For example, two subsystems (e.g., the camera processor and connectivity module) can be forced into any control state by the master subsystem independently of each slave state.

According to aspects of the present disclosure, a bi-directional, asynchronous, half duplex, single-wire control interface is introduced for master-slave PMICs. The control interface may have applicability in VR and AR applications, for example, or any application involving separated PCBs. Although half duplex operation is described, the present disclosure also applies to full duplex operation with additional hardware and software resources. Integration of slave subsystems with a master subsystem through the single wire interface meets specifications for improved or even optimal interconnectivity in AR and VR applications. Control functions implemented over the single wire interface may include a power on trigger, master island fault propagation, a fail-safe reset trigger, slave status acknowledgment, and slave processor induced graceful shutdown (SHDN) of a slave PMIC.

Figure 5:
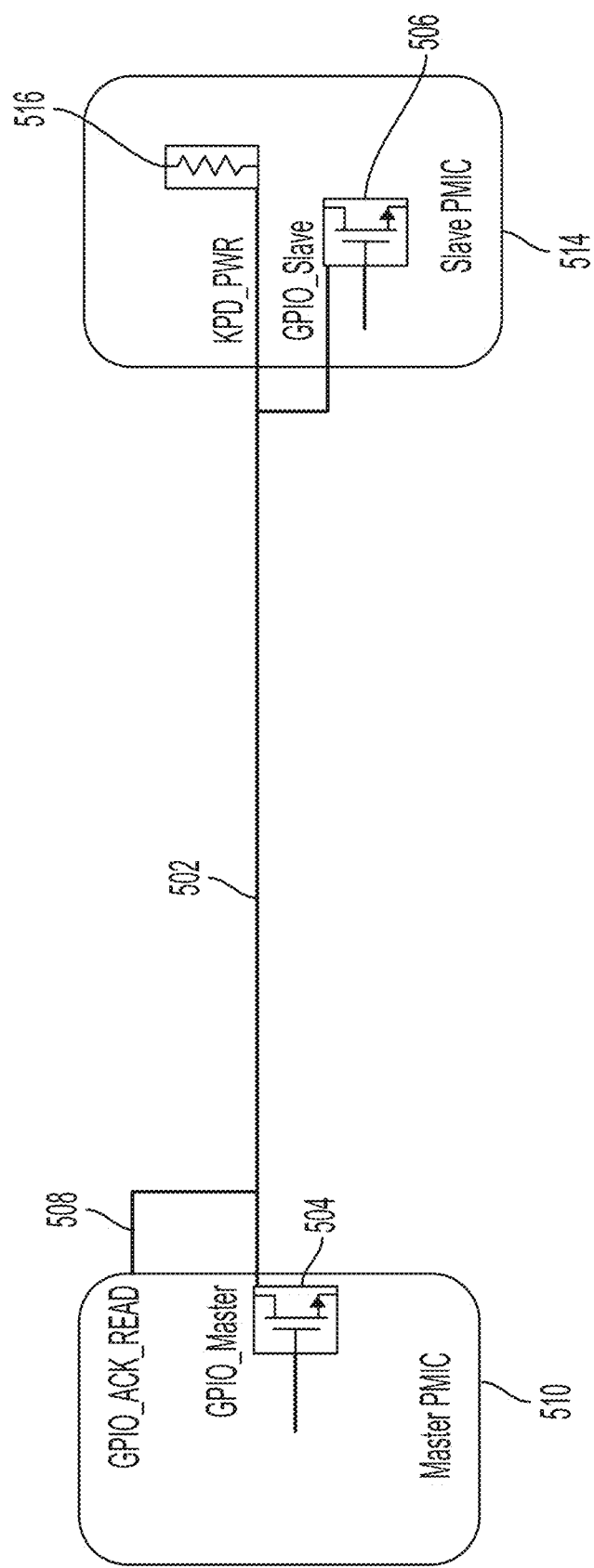
FIG. 5 is a diagram illustrating a single wire control interface between a master subsystem and a slave subsystem, in accordance with aspects of the present disclosure.

FIG. 5 is a diagram illustrating a single wire control interface between a master subsystem and a slave subsystem, in accordance with aspects of the present disclosure. In the example of FIG. 5, a master PMIC 510 communicates with a slave PMIC 514 via a single wire control interface 502. In the example of FIG. 5, the control interface 502 couples between a source of a transistor 504 (e.g., NMOS) in the master PMIC 510 and a source of a transistor 506 in the slave PMIC 514 in an open drain configuration. A write pin (not labelled) couples the transistor 504 to the control interface 502. The transistors 504, 506 are configured to pull the control interface 502 low when a command is to be sent. A read pin 508 at the master PMIC 510 is also coupled to the control interface 502 to receive signals from the slave PMIC 514. The read pin 508 may be a general purpose input output (GPIO) acknowledgement (ACK) read pin. A pull up device 516 (e.g., a resistor) is also coupled to the control interface 502 to weakly pull up the signal on the control interface 502. The line to the pull up device 516 is referred to as a hardware reset pin (KPD_PWR). When a command is to be transmitted from the slave PMIC 514, the transistor 506 pulls down the signal on the control interface 502.

Figure 6:
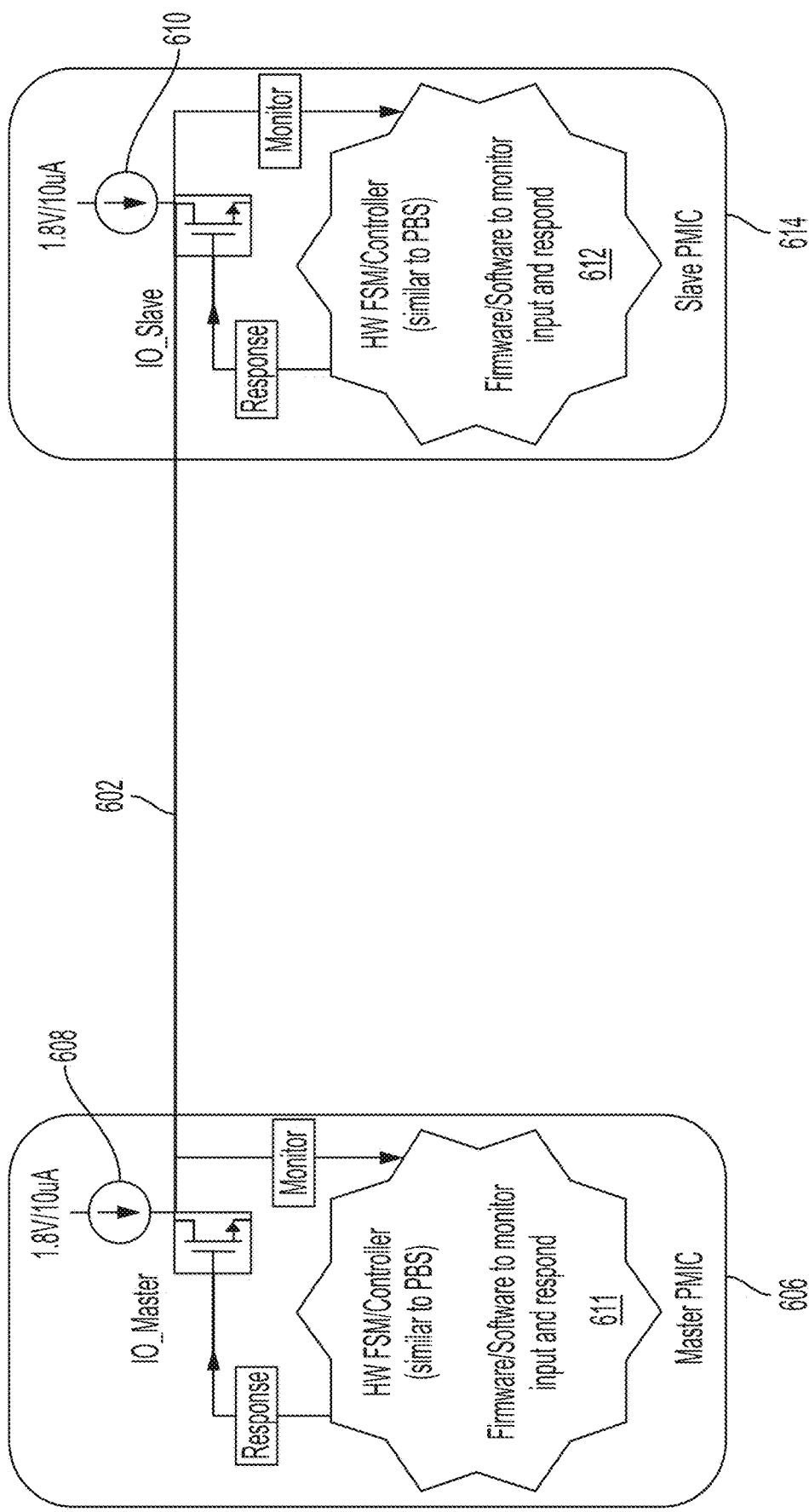
FIG. 6 is a diagram illustrating a single wire control interface between a master subsystem and a slave subsystem, in accordance with aspects of the present disclosure.

FIG. 6 is a diagram illustrating a single wire control interface between a master subsystem and a slave subsystem, in accordance with aspects of the present disclosure. The elements of FIG. 6 that are similar to those shown in FIG. 5 are not described again. In the example of FIG. 6, a current source 608 is provided in a master PMIC 606 and a current source 610 is provided in a slave PMIC 614. The current sources 608, 610 may be 1.8 V and 10 microamperes (μA), in some exemplary implementations. The current sources 608, 610 weakly pull up the signal on a control interface 602 until a command is to be sent. Thus, an assertion by a transmitting component corresponds to a falling edge. In the example of FIG. 6, a hardware finite state machine (FSM)/controller along with firmware and/or software 611, 612 are provided in the master PMIC 606 and slave PMIC 614, respectively, to monitor for input on the control interface 602 and respond to the input. Hardware/firmware/software 611, 612 may operate similar to a programmable boot sequence (PBS) is some implementations.

The functions supported by the example implementation shown in FIG. 6 include power on triggers. The power on triggers may be controlled by a master SoC or may be controlled by a timer. Power on triggers to various slave PCBs may be time-independent or asynchronous to each other. The implementation shown in FIG. 6 may also support reset triggers. Reset triggers may include a master triggered subsystem reset for slave PCB software in a bad or unexpected state. The reset triggers may also enable recovery from a crash in a slave PCB software driver. Shutdown triggers may also be supported. Shutdown triggers may be signaled from the master subsystem (e.g., in a system shutdown). The slave subsystem may also trigger a shutdown, for example a self-shutdown, such as when faults are detected in a slave PCB, slave PMIC, or slave SoC.

The implementation of FIG. 6 may also support fault propagation. For example, fault propagation may enable the slave PCB to be in sync with master PCB faults. In some implementations, the master SoC or PMIC always monitors the slave PCB for bad states. Fail-safe reset triggers may be supported for when the master or slave software is hung. A user-forced reset may also trigger a fail-safe reset.

Figure 7:
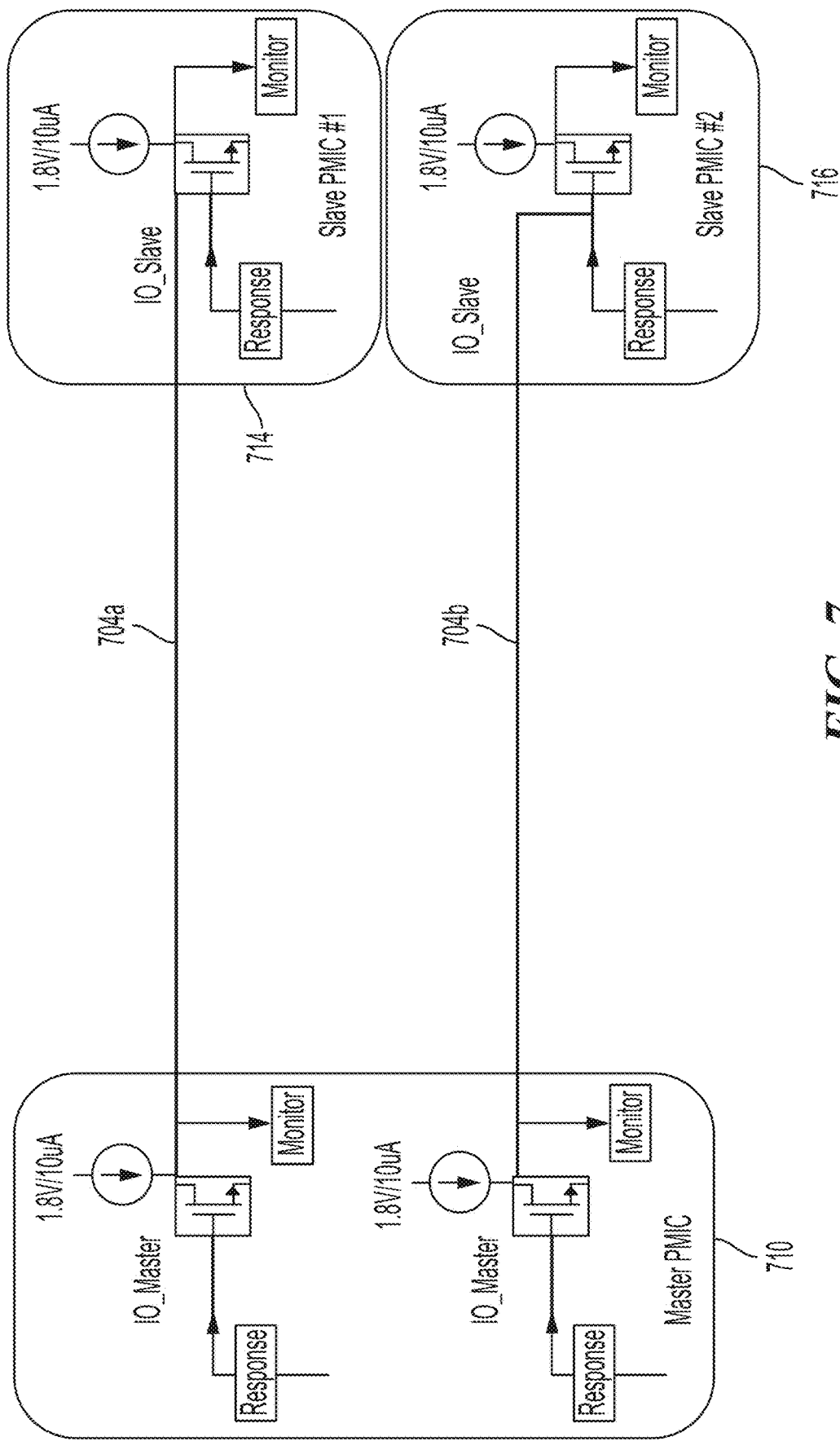
FIG. 7 is a diagram illustrating a control interface between a master subsystem and multiple slave subsystems, in accordance with aspects of the present disclosure.

FIG. 7 is a diagram illustrating a control interface between a master subsystem and multiple slave subsystems, in accordance with aspects of the present disclosure. In the example of FIG. 7, scalability is offered by providing a standard configuration for attaching multiple slave subsystems. In FIG. 7, a master PMIC 710 communicates with a first slave PMIC 714 via a first control interface 704a. The master PMIC 710 also communicates with a second slave PMIC 716 via a second control interface 704b. Thus, each slave PMIC 714, 716 has its own control interface 704a, 704b. The implementation example of FIG. 7 provides re-usability, such that digital logic, firmware, or software is generic across slave types and AR/VR applications. The standardization reduces risk while in the planning phase. One particular connectivity design includes a single trace for each slave subsystem, and also a single pin for each slave subsystem. No signal integrity specifications lead to signaling with relaxed requirement on rise or fall times, and signal exchanges that are timing non-critical, thereby avoiding clock synchronization or dependency. The plug-and-play feature removes dependency on control functions of other slave subsystems. The implementation of FIG. 7 is easy to debug due to the design that exposes control and monitor signals between the master and slave subsystems.

Figure 8:
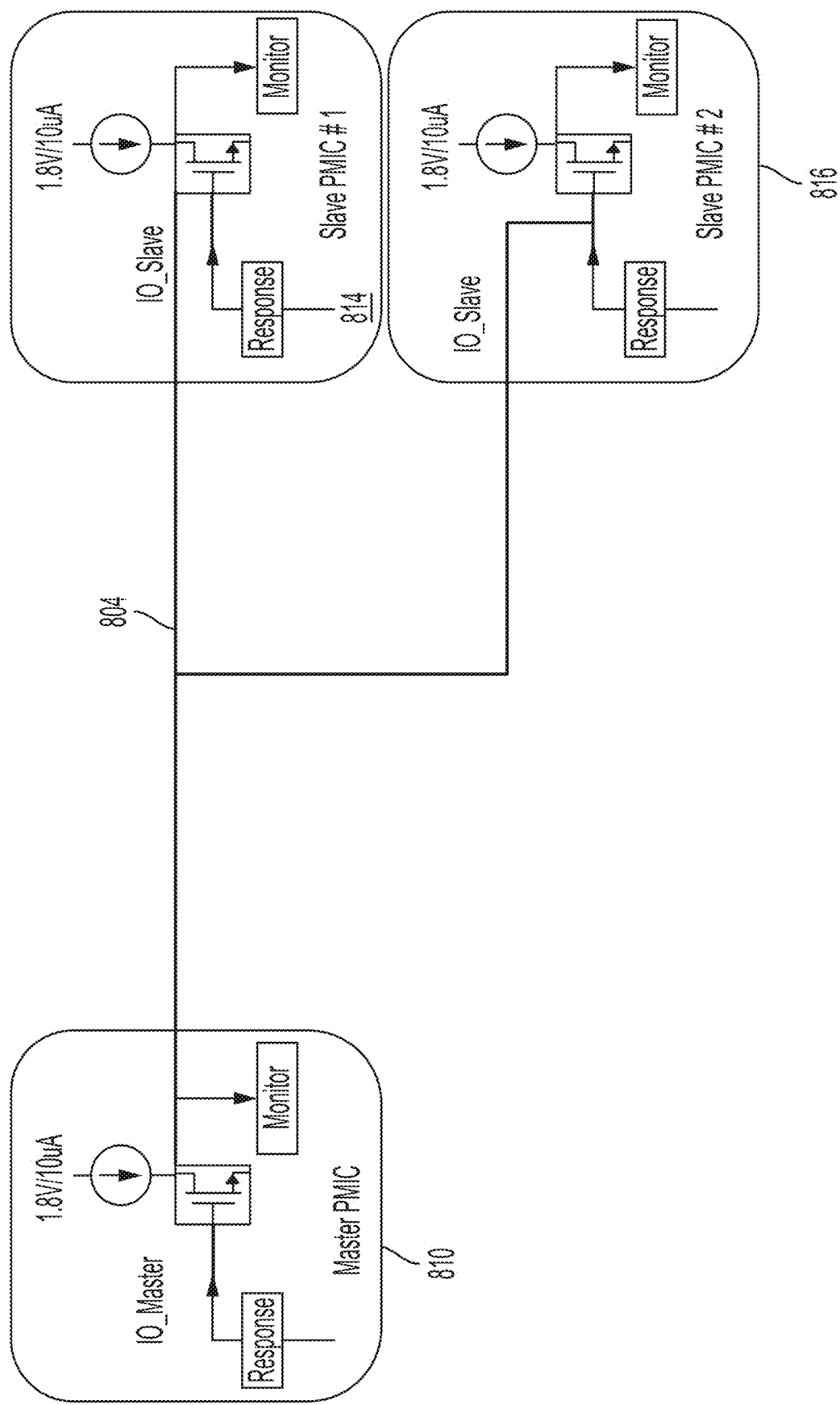
FIG. 8 is a diagram illustrating a control interface between a master subsystem and multiple slave subsystems, in accordance with aspects of the present disclosure.

FIG. 8 is a diagram illustrating a control interface between a master subsystem and multiple slave subsystems, in accordance with aspects of the present disclosure. In the example of FIG. 8, a common control interface 804 couples a master PMIC 810 to multiple slave PMICs 814, 816. The implementation of FIG. 8 may specify higher complexity in firmware or software than the implementation of FIG. 7.

Figure 9:
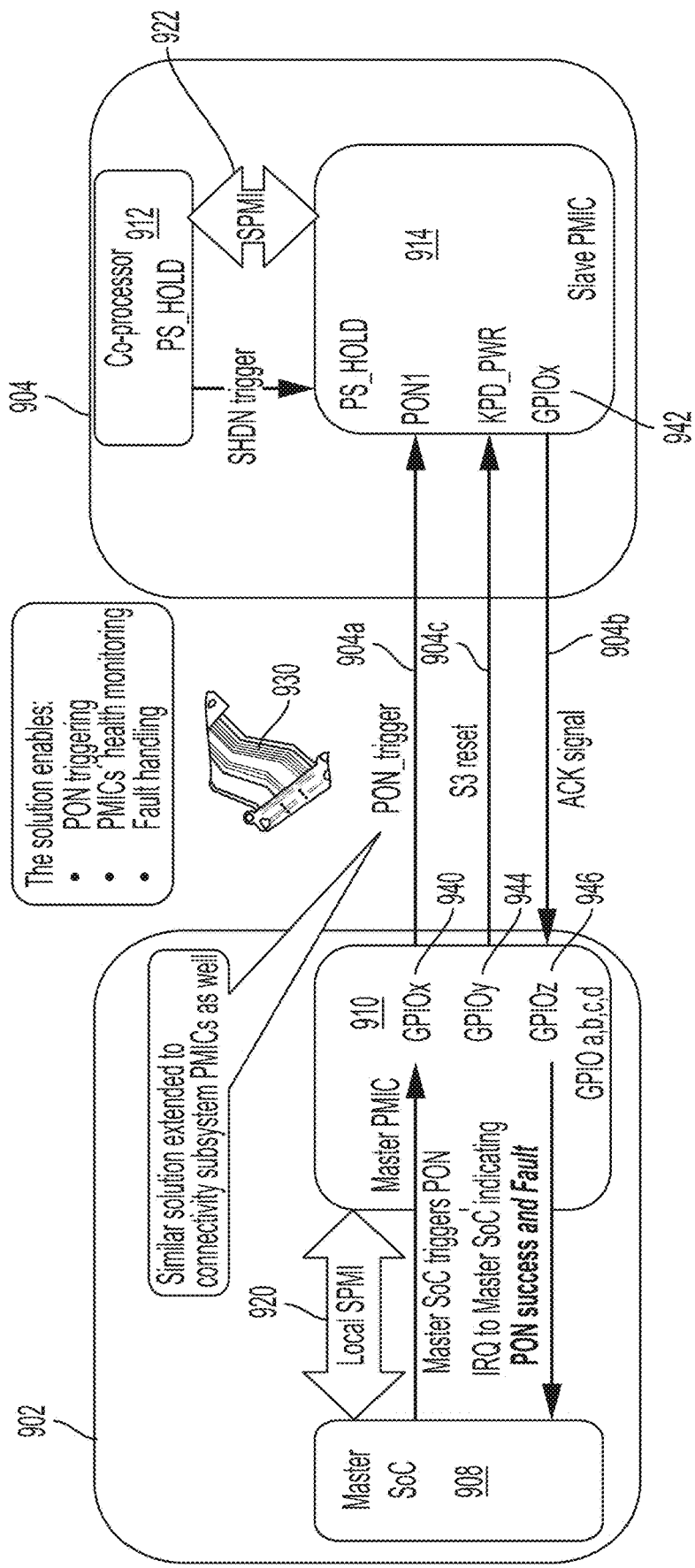
FIG. 9 is a diagram illustrating control interfaces between subsystems on multiple PCBs, in accordance with aspects of the present disclosure.

FIG. 9 is a diagram illustrating control interfaces between subsystems on multiple PCBs, in accordance with aspects of the present disclosure. In the example of FIG. 9, a first PCB 902 hosts a first subsystem including a master SoC 908 and a master PMIC 910. A second PCB 904 hosts a second subsystem including a slave SoC 912 and a slave PMIC 914 The subsystems are located on different PCBs 902, 904 that are connected with long flex cables 930 with high insertion loss. A similar solution may be extended to other PCBs, such as a PCB supporting a connectivity module and associated PMIC. A local interface 920 couples the master SoC 908 to the master PMIC 910. A local interface 922 couples the slave SoC 912 to the slave PMIC 914. The local interfaces 920, 922 may be compliant with the SPMI protocol.

In the example implementation shown in FIG. 9, the master SoC 908 triggers a power on (PON), causing the master PMIC 910 to signal a power on across a first control interface 904a. A GPIO pin (GPIOx 940) may couple the first control interface 904a to the master PMIC 910. A power on pin (PON1) may couple the first control interface 904a to the slave PMIC 914. In response to receiving the power on trigger, the slave PMIC 914 may transmit an acknowledgment signal across a second control interface 904*b* via a GPIO pin (GPIOx 942). The master PMIC 910 receives the acknowledgment indicating power on success, via a GPIO pin (GPIOz 946). The master PMIC 910 generates an interrupt request (IRQ) to the master SoC 908 indicating the successful power on.

In the example implementation of FIG. 9, a fault occurs at the slave PMIC 914 or slave SoC 912. Consequently, the slave SoC 912 transmits a shutdown (SHDN) trigger to the slave PMIC 914 via shutdown trigger pin (PS_HOLD, also referred to as power supply hold). The slave PMIC 914 may transmit a fault signal across the second control interface 904*b* via the GPIO pin (GPIOx 942). The master PMIC 910 receives the signal indicating a fault, via the GPIO pin (GPIOz 946). The master PMIC 910 generates an interrupt request (IRQ) to the master SoC 908 indicating the fault.

A third control interface 904*c* also couples the master PMIC 910 and the slave PMIC 914 via a GPIO pin (GPIOy 944) and a hardware rest pin (KPD_PWR) to enable a fail-safe (S3) reset, for example if the master software freezes.

Figure 10:
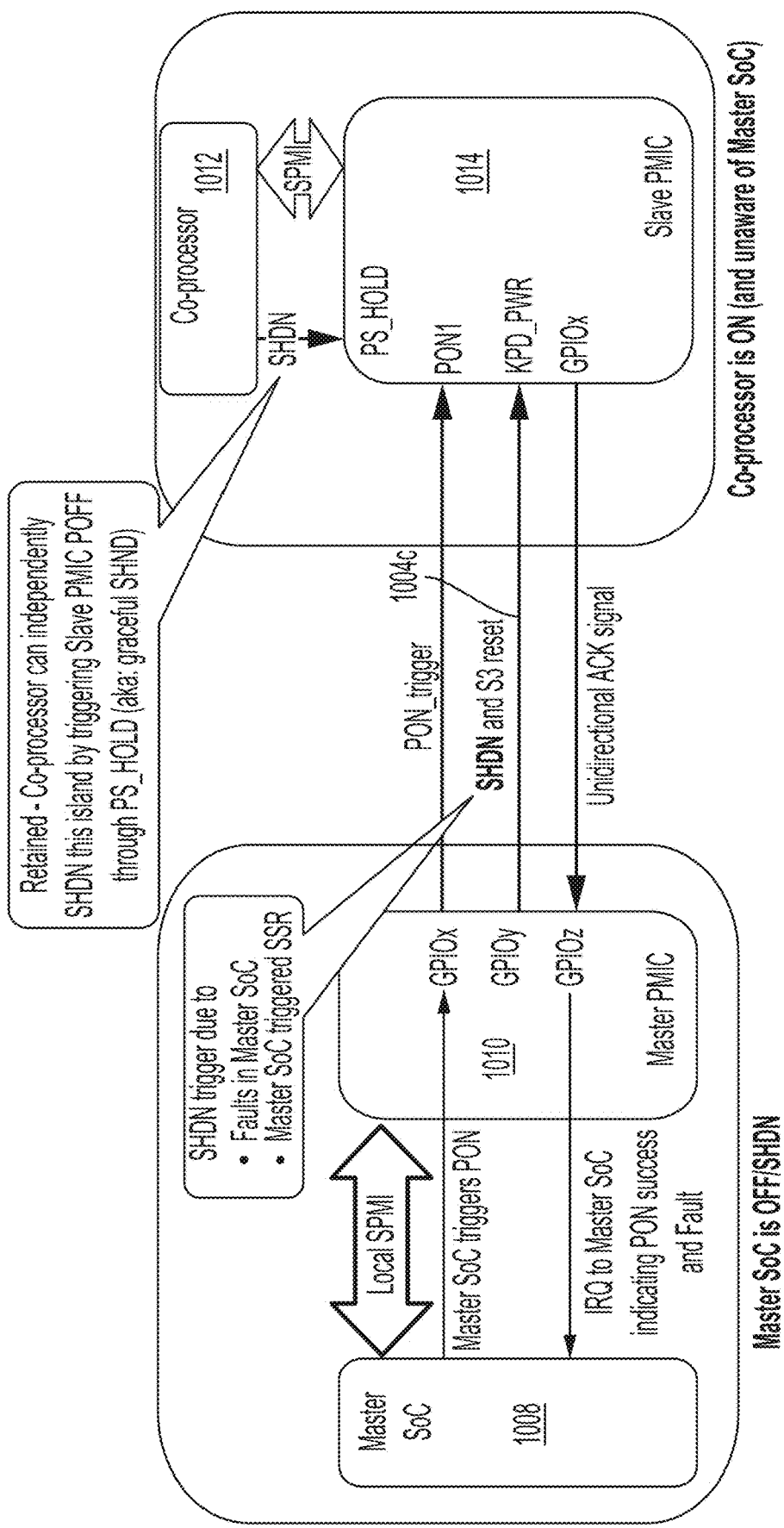
FIG. 10 is a diagram illustrating control interfaces, including an overloaded interface, between subsystems on multiple PCBs, in accordance with aspects of the present disclosure.

FIG. 10 is a diagram illustrating control interfaces, including an overloaded interface, between subsystems on multiple PCBs, in accordance with aspects of the present disclosure. In the example of FIG. 10, a third control interface 1004*c* is overloaded. The third control interface 1004*c* enables a master SoC 1008 to trigger a subsystem reset (SSR), for example, in case a fault occurs in the master SoC 1008. A shutdown (SHDN) trigger shuts down a slave SoC 1012 when the master SoC 1008 shuts down. In this implementation, master PMIC 1010 shutdown sequence turns off a slave PMIC 1014 and the slave SoC 1012 by overloading shutdown functionality on top of fail-safe (S3) reset triggers on a same pin (GPIOy) of the master PMIC 1010. The functionality may be multiplexed, for example, by assigning different times to each signal. In one example multiplexing implementation, shutdown is triggered when the signal is held at a low level for x ms (e.g., x=10 ms). The fail-safe reset is triggered if the control interface 1004*c* is held low for y ms, where y>>x (e.g., y=16 secs). In the example of FIG. 10, the slave SoC 1012 can independently shut down the slave subsystem by triggering the slave PMIC 1014 via the shutdown trigger pin (PS_HOLD) to enable a graceful shutdown.

Figure 11:
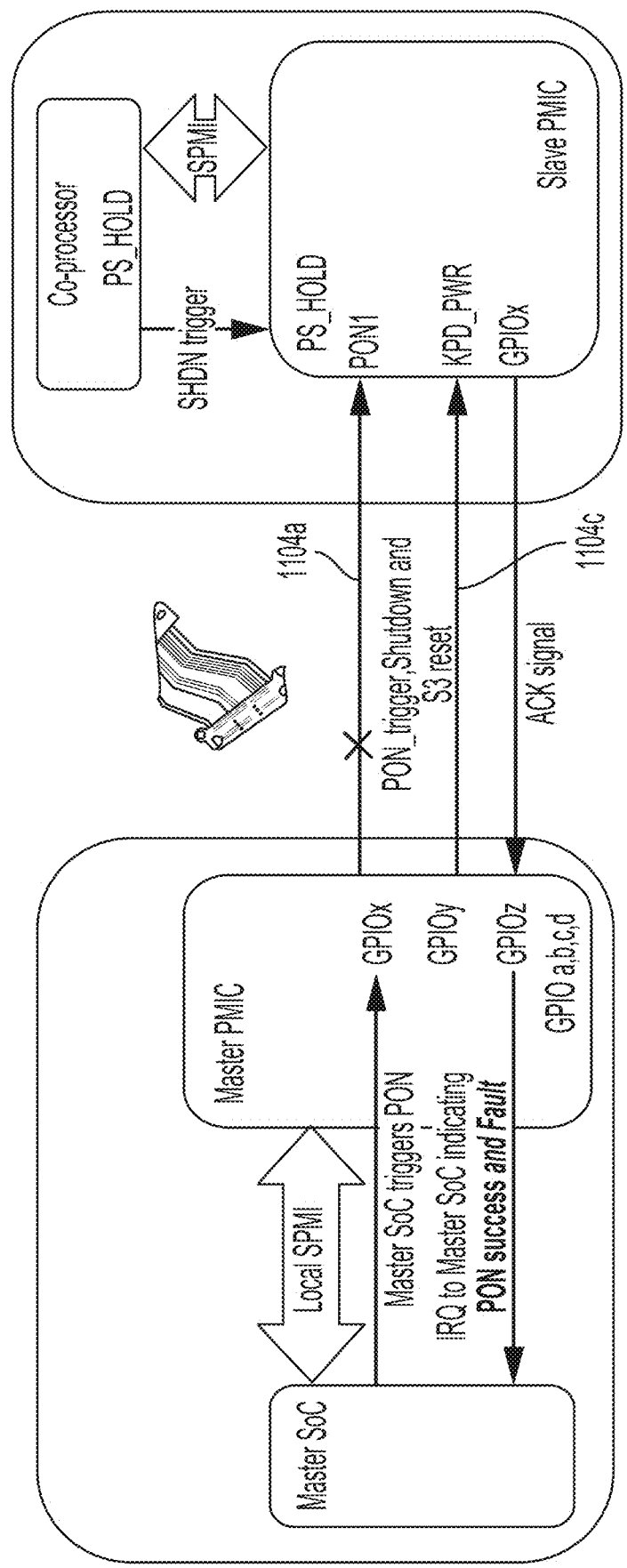
FIG. 11 is a diagram illustrating an improved control interface, including an overloaded interface, between subsystems on multiple PCBs, in accordance with aspects of the present disclosure.

One of the control interfaces may be eliminated to improve the cost of the pins and traces, for example, when crossing a hinge with a flexible trace. FIG. 11 is a diagram illustrating an improved control interface, including an overloaded interface, between subsystems on multiple PCBs, in accordance with aspects of the present disclosure. In the example of FIG. 11, the power on, shutdown, and fail-safe reset triggers are overloaded on a same set of pins and a control interface 1104*c*. A first control interface 1104*a* is eliminated. The power on trigger is edge triggered. In other words, the power on trigger only arrives when the slave subsystem is off. The power on trigger is thus mutually exclusive from the other two triggers, which occur when the subsystem is on. In one example implementation, shutdown is triggered when the signal is held at a low level for x ms (e.g., x=10 ms). The fail-safe reset is triggered if the control interface 1004*c* is held low for y ms, where y>>x (e.g., y=16 secs). Upon a fail-safe reset event, the device could power back on (e.g., if the trigger is held low for >y). Software (SW) may enable an immediate shutdown.

Advantages of the implementation shown in FIG. 11 include a reduced count of wires or interfaces crossing the hinges (e.g., two wires). As a result, the board-to-board (B2B) connector and form factor width is improved. The number of pins on both the slave and master PMICs is also reduced.

In some aspects, it may be desirable for a display to remain on during a system fault recovery. To enable this feature, the shutdown trigger pin (PS_HOLD) may be reconfigured to implement a warm reset (WR) during mission mode, e.g., an operational state by the end user. A warm reset maintains the power for a portion of the slave PMIC during a reset. For example, a display may be maintained while a camera is reset. Hence, there is a need for an alternate graceful shutdown trigger from the slave SoC to the slave PMIC. A proposed solution for the slave SoC to gracefully shut itself down is now described with respect to FIG. 12.

Figure 12:
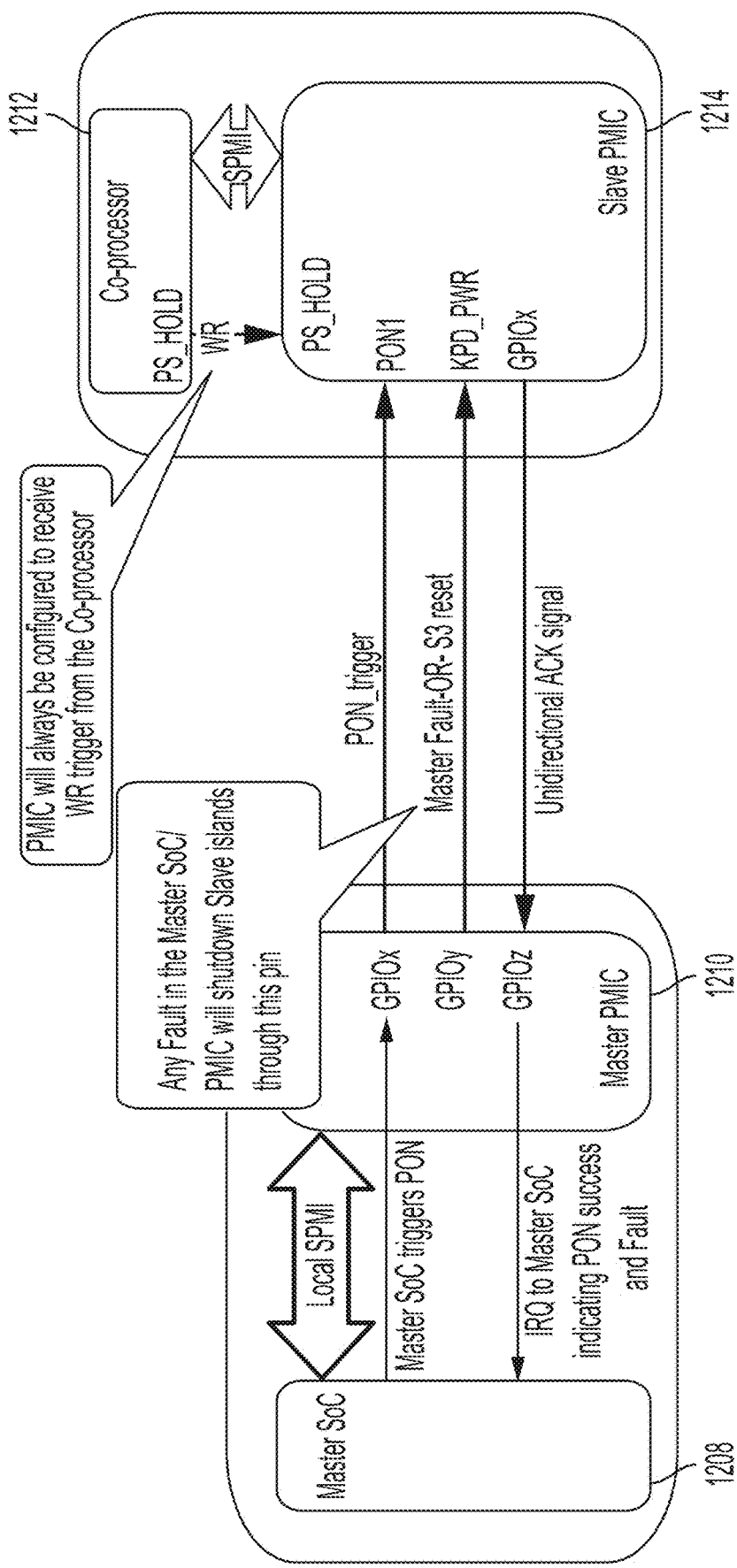
FIG. 12 is a diagram illustrating a control interface for enabling a warm reset, in accordance with aspects of the present disclosure.

FIG. 12 is a diagram illustrating a control interface for enabling a warm reset, in accordance with aspects of the present disclosure. In the example of FIG. 12, a slave SoC 1212 triggers a warm reset (WR) to a slave PMIC 1214 via the shutdown trigger pin (PS_HOLD). A master PMIC 1210 may also initiate a slave shutdown, for example, based on a fault in a master SoC 1208 or master PMIC 1210. The master PMIC 1210 initiated shutdown may be sent via a GPIO pin (GPIOy).

Figure 13:
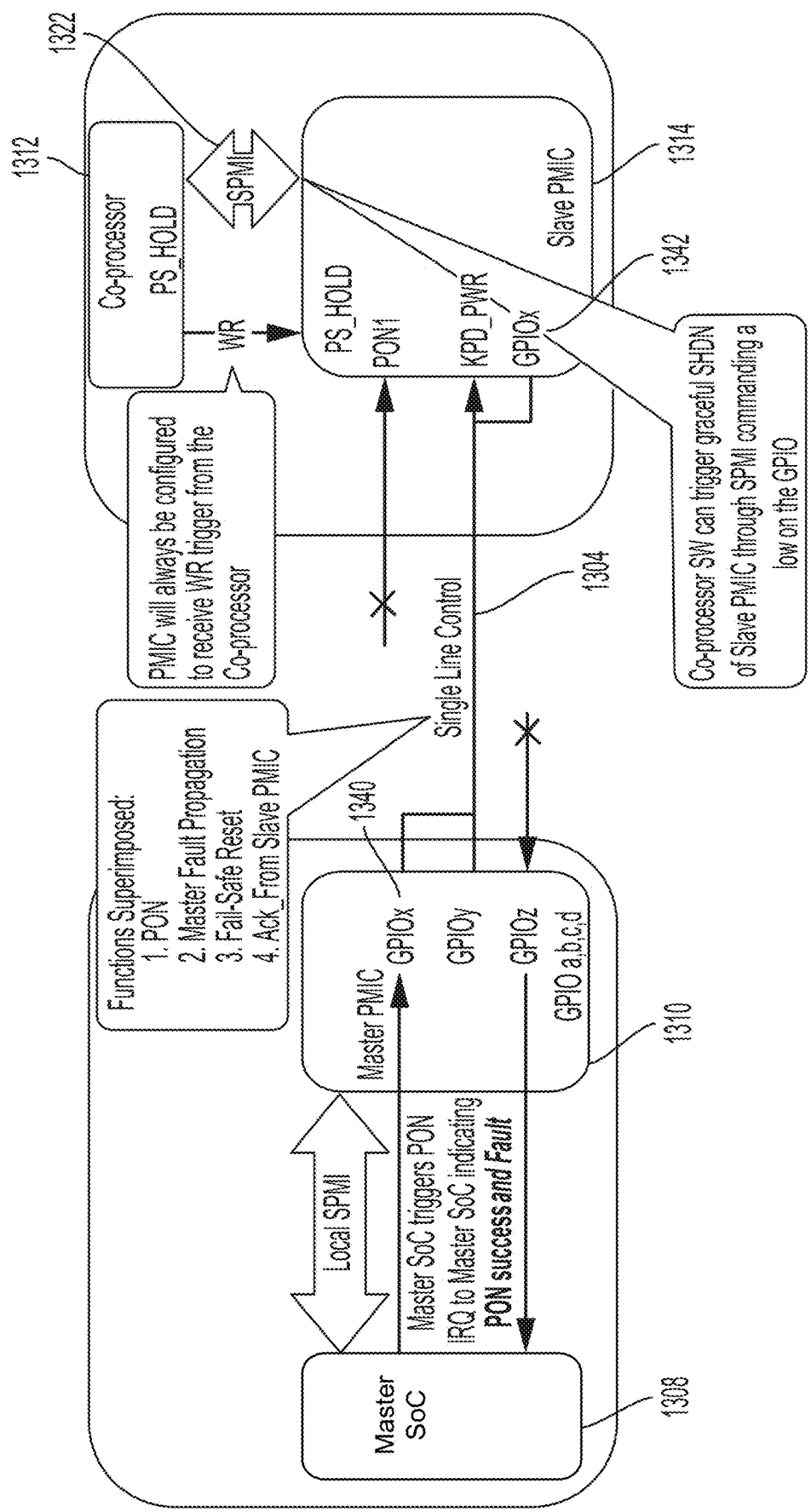
FIG. 13 is a diagram illustrating a single control interface between subsystems on multiple PCBs, in accordance with aspects of the present disclosure.

FIG. 13 is a diagram illustrating a single control interface between subsystems on multiple PCBs, in accordance with aspects of the present disclosure. According to aspects of the present disclosure, a single control wire is used, with improved or even optimized side band signaling. In the implementation shown in FIG. 13, no feature, control, reset, or trigger functional flow is sacrificed. The acknowledgment (ACK) signal from a slave PMIC 1314 to a master PMIC 1310 is overloaded on a same control interface 1304 as the power on trigger, shutdown trigger, and fail-safe (S3) reset trigger. The master PMIC 1310 is the single point of control of all resets and monitoring of slave PMIC 1314 health/status. In the example of FIG. 13, software (SW) at a slave SoC 1312 can gracefully shutdown the slave PMIC 1314 via a local interface 1322, which may be SPMI compliant. In response to receiving the signal via the local interface 1322, the slave PMIC 1314 pulls the control interface 1304 low on a GPIO pin (GPIOx 1342). The master PMIC 1310 may couple to the control interface 1304 via two pins: a sensing pin (GPIOy) and a transmitting pin (GPIOx 1340). Similarly, the slave PMIC 1314 may couple to the control interface 1304 via two pins: a sensing pin (KPD_PWR) and a transmitting pin (GPIOx 1342).

PMIC state control is now discussed in more detail. Control functions implemented over the single wire interface may include a power on trigger, master subsystem fault propagation, fail-safe reset, slave status acknowledgment, and slave processor induced graceful shutdown of the slave PMIC. The power on and reset triggers from the master subsystem to the slave subsystem are discussed with respect to FIG. 14.

Figure 14:
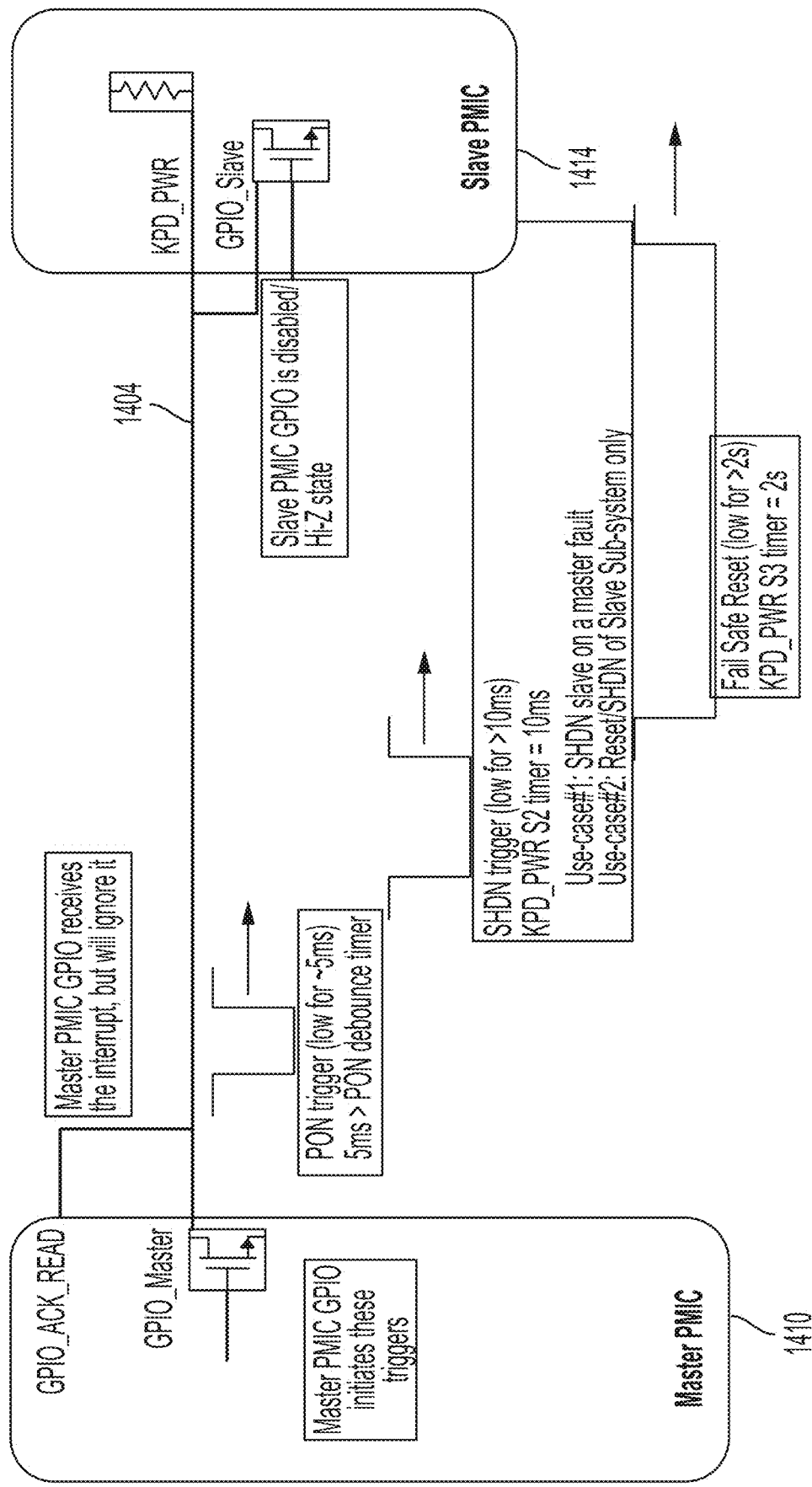
FIG. 14 is a diagram illustrating power on and reset triggers over a single control interface between subsystems on multiple PCBs, in accordance with aspects of the present disclosure.

FIG. 14 is a diagram illustrating power on and reset triggers over a single control interface between subsystems on multiple PCBs, in accordance with aspects of the present disclosure. In the example of FIG. 14, a master PMIC 1410 initiates a power on trigger to a slave PMIC 1414 by holding a control interface 1404 low for a period of time, such as five ms. The period of time should be longer than a debounce timer. A shutdown trigger may also be initiated by the master PMIC 1410. The master PMIC 1410 initiates the shutdown trigger by holding the control interface 1404 low for a different period of time, e.g., greater than 10 ms. A hardware reset pin (KPD_PWR) may be assigned to a 10 ms timer (KPD_PWR S2 timer) to recognize the shutdown trigger. For example, the master PMIC 1410 may detect a fault, and as a result, shut down the slave PMIC 1414 along with the master PMIC 1410. In another example, the master PMIC 1410 resets or shuts down only the slave PMIC 1414. A fail-safe reset may be detected when the control interface 1404 is held low for a third time duration, e.g., more than two seconds. The hardware reset pin (KPD_PWR) may be assigned to a two second timer (KPD_PWR S3 timer) to recognize the fail-safe reset trigger. During the power on, reset, and shutdown triggers, the slave PMIC GPIO pin may be disabled or placed in a high impedance state. Similarly, the master PMIC GPIO pin will receive any interrupt sent from the slave PMIC 1414 over the control interface 1404, but will ignore the interrupt.

Figure 15:
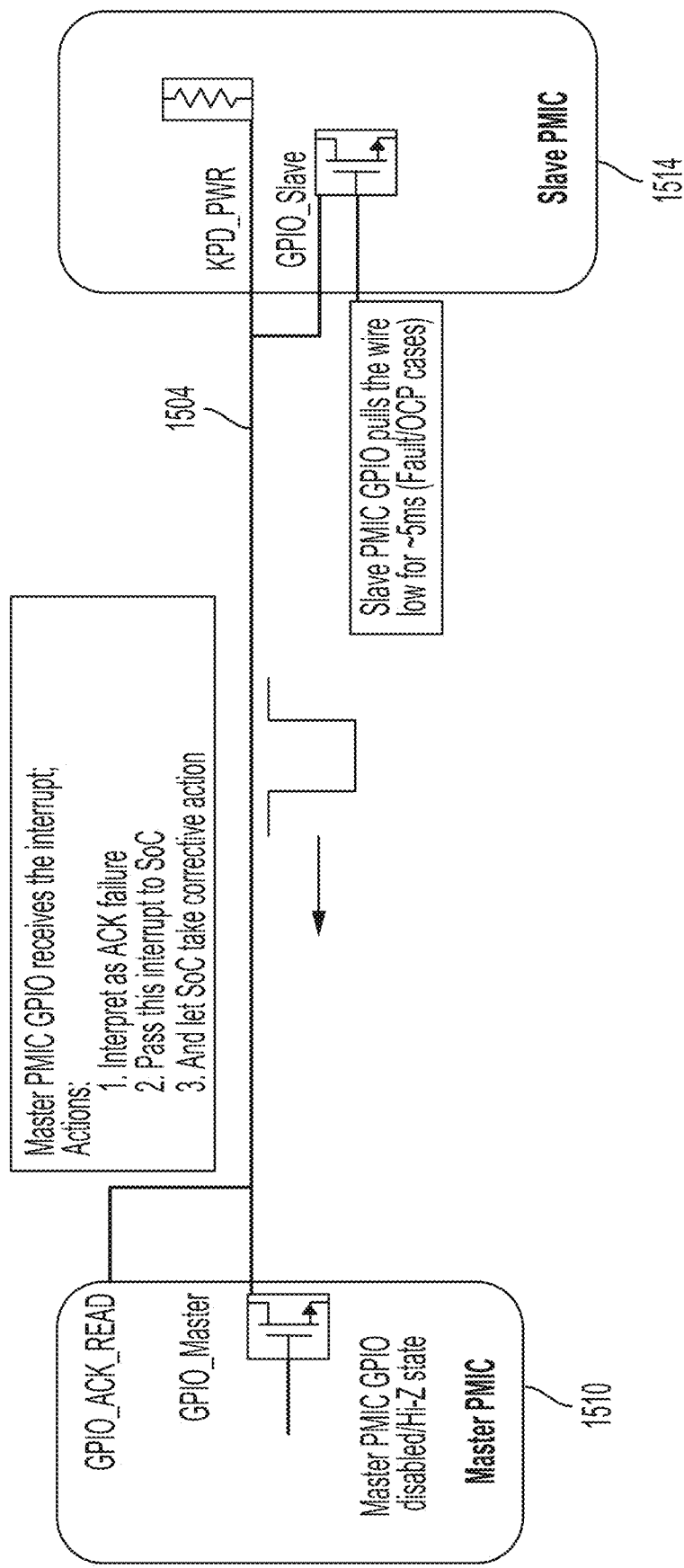
FIG. 15 is a diagram illustrating failure acknowledgment over a single control interface between subsystems on multiple PCBs, in accordance with aspects of the present disclosure.

Implementation of the slave PCB failure acknowledgement control function will now be discussed with reference to FIG. 15. FIG. 15 is a diagram illustrating failure acknowledgment over a single control interface between subsystems on multiple PCBs, in accordance with aspects of the present disclosure. In the example of FIG. 15, a slave PMIC 1514 transmits an interrupt on a control interface 1504 by pulling the control interface 1504 low for a period of time, e.g., five ms. This may occur in response to detecting a fault case or over-current protection (OCP) case. A master PMIC 1510 receives the interrupt on a GPIO pin and interprets the acknowledgment (ACK) as a failure at the slave PMIC 1514. The master PMIC 1510 passes the interrupt to a master SoC (not shown) for the master SoC to take corrective action. During the slave PCB failure acknowledgement, the master PMIC GPIO pin (GPIO_Master) may be disabled or placed in a high impedance state.

Figure 16:
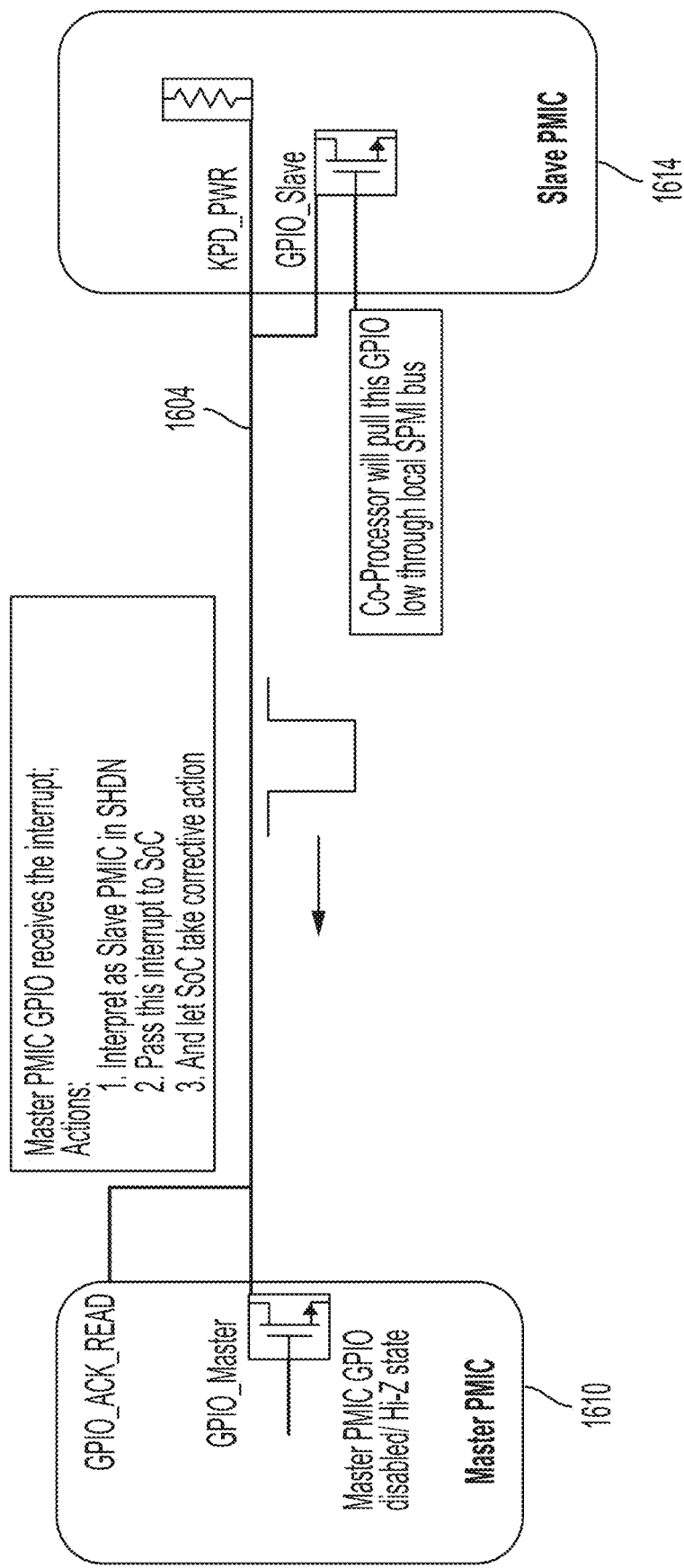
FIG. 16 is a diagram illustrating self-shutdown over a single control interface between subsystems on multiple PCBs, in accordance with aspects of the present disclosure.

The slave SoC induced self-shutdown control function will now be discussed with respect to FIG. 16. FIG. 16 is a diagram illustrating self-shutdown over a single control interface between subsystems on multiple PCBs, in accordance with aspects of the present disclosure. In the example of FIG. 16, a slave SoC (or co-processor) (See 1312 of FIG. 13) triggers a self-shutdown via a local interface 1322 (See FIG. 13). As a result, a slave PMIC 1614 pulls a control interface 1604 low for a period of time. A master PMIC 1610 receives the interrupt, interprets the interrupt as a slave PMIC shutdown, and passes the interrupt to the master SoC (not shown in FIG. 16) for the master SoC to take corrective action. During the slave SoC self-shutdown, the master PMIC GPIO pin (GPIO_Master) may be disabled or placed in a high impedance state.

Control flow details will now be discussed with respect to FIG. 17-19. FIG. 17 is a table illustrating GPIO pin configurations by master and slave PMICs in various power on states, in accordance with aspects of the present disclosure. A default state may be set in a self-triggered configuration sequence (referred to as DVDD_CFG) upon power up (e.g., upon battery insertion). The DVDD_CFG brings the hardware configuration to a good known state before the device is active. The default state may be set in the DVDD_CFG such that the GPIO_Master and GPIO_Slave pins are disabled with no power up or power down. The GPIO_ACK_READ pin is disabled for the default state, the power off state, and the fault sequence, without power up and power down.

A programmable boot sequence (PBS) state for a master PMIC for the default state, a power off (POFF) state, and a fault state disable the GPIO pin on the master PMIC, such that no internal power up (PU) or power down (PD) occurs. The GPIO_ACK_Read pin is also disabled. For a power on (PON) state, the GPIO pin on the master PMIC is disabled, such that no internal power up (PU) or power down (PD) occurs. The GPIO_ACK_Read pin is placed in an input mode and no internal power up (PU) or power down (PD) occurs. For the slave PMIC in a default state, a power off (POFF) state, a power on (PON) state, or a fault state, the GPIO pin on the slave PMIC is disabled, such that no internal power up (PU) or power down (PD) occurs.

FIG. 18 is a table illustrating pin configurations for slave SoC triggering of shutdown of the slave PMIC, in accordance with aspects of the present disclosure. The shutdown may be triggered without altering the shutdown trigger pin (PS_HOLD) function. In some aspects, the PMIC shutdown trigger pin (PS_HOLD) may be configured for a warm reset. When the slave SoC triggers shutdown of the slave PMIC, the slave SoC is the controlling entity and the GPIO master pin is disabled (no internal power up or power down). The GPIO_Slave pin is set to an open drain configuration to pull down the control interface. The signal remains asserted until the slave PMIC self-triggers a shutdown (S2 SHDN). The GPIO_ACK_READ pin is placed in input mode. The master SoC will receive interrupt messages while in this state.

FIG. 19 is a table illustrating general purpose input or output (GPIO) pin configurations for controlling a slave PMIC, in accordance with aspects of the present disclosure. When the master PMIC triggers a power on function for the slave PMIC, the GPIO pin on the master PMIC is set to an open drain configuration, without internal power up or power down. The GPIO_Master pin asserts a signal for 10 ms, pulling low the PMIC KPD_PWR pin. The GPIO_Master pin de-asserts the GPIO pin, which is then configured to a disabled state. The GPIO pin on the slave PMIC is disabled, while the GPIO_ACK READ pin is configured to input mode without power up/power down to avoid interfering with the slave PMIC KPD_PWR pull up resistor.

For acknowledgement of a successful power on of the slave PMIC (or no errors), GPIO_Master and GPIO_Slave pins are disabled, with no power up or power down. No interrupt is sent to the master SoC through the GPIO_ACK_READ pin, which is set to the input mode. The master SoC assumes all is ok with the slave PMIC.

For failure acknowledgement by the slave subsystem, the GPIO_Master pin is disabled (without power up or power down). The GPIO_Slave pin executed in the fault and over-current protection (OCP) programmable boot sequence (PBS) sequences is configured to open drain (with no power up or power down). The pin asserts a signal for one ms and then de-asserts the GPIO_Slave pin to send an interrupt to the master SoC. Then pin then returns to the disabled state. An immediate interrupt is communicated to the master SoC (through the GPIO_ACK_READ pin) that the slave PMIC is shutting down. For a shutdown trigger (S2), both the power off and fault sequences of the slave PMIC reset the GPIO_Slave pin to the disabled state. The reset avoids further triggering of a fail-safe (S3) reset or a self-induced power on re-trigger.

For a subsystem reset (SSR), the GPIO_Master pin is configured to open drain (with no power up or power down). Consequently, the GPIO_Master pin asserts a signal for greater than the slave PMIC shutdown trigger (S2) timer, de-asserts the signal, and then configures the pin back to the disabled state. The GPIO_Slave pin remains in the disabled state (with no power up or power down). The GPIO_ACK_READ pin is set to input mode. The master SoC receives the interrupt but ignores it because the master SoC is initiating the subsystem reset.

For a fail-safe reset (S3 reset), the behavior is similar to a subsystem reset, except the GPIO_Master pin is asserted for greater than the fail-safe (S3) reset timer. In some implementations, the GPIO_Master pin is asserted only by the master PMIC on receiving the user induced external power button press (e.g., lasting 16 seconds). The master SoC receives the interrupt but ignores it because the master SoC is initiating the fail-safe (S3) reset.

Aspects of the present disclosure may use side-band signaling with SPMI connectivity between a master PMIC and slave PMICs that are placed on different PCBs. The master PMIC controls, and the slave PMICs communicate through GPIO pins All slave PMIC controls (e.g., power on, reset, monitor, etc.) are performed by the master PMIC. Because side band signals are expensive for pin count and hinge traces, a smallest number of traces providing the complete control/functions may be selected.

As described above, a master PMIC on one PCB may interface with slave PMICs on other PCBs to integrate PCBs located apart from one another. In some aspects of the present disclosure, a single control interface is provided between the PCBs. In other aspects, multiple control interfaces are provided between the PCBs. A first control interface may enable a power on trigger to initiate a power on sequence in a slave PMIC. A second control interface may enable a fail-safe (S3) reset for a fail-safe reset of the slave PMICs and corresponding subsystems. This enables fault handling techniques that are not recoverable through software mechanisms. A third control interface may be for acknowledgement from the slave PMIC to the master PMIC. The set of control interfaces may be repeated between the master PMIC in the main PCB and another set of slave PMICs sitting on other PCBs.

The acknowledgement from the slave PMIC to the master PMIC helps with monitoring the health of the slave PMICs. The acknowledgement may be implemented in two ways. In a first implementation, a toggle may indicate whether a power on is successful or if there is a fault in the slave PMIC. In a second implementation, pulses of varying frequency, duty cycle, and duration may represent different faults of the slave PMIC that is generating the signal. In the second implementation, a logic high indicates the slave PMIC has completed the power on successfully and is in a good condition.

Multiplexing control signals over a reduced number of interfaces between separate PCBs integrates a multi-PCB architecture. Hence, this solution may be used in sleek form factor AR and VR designs, e.g., socially acceptable form factors. The inter-PCB control interface eliminates multi-drop star routed messaging across PCBs that would result in large debug cycles and field returns. The inter-PCB control interface enables a subsystem reset feature that improving debuggability and recovery of the system by localizing any issue to the subsystem and thus offers an improved user experience. The inter-PCB control interface is a low latency interface that enables fast boot and fast recovery.

Figure 20:
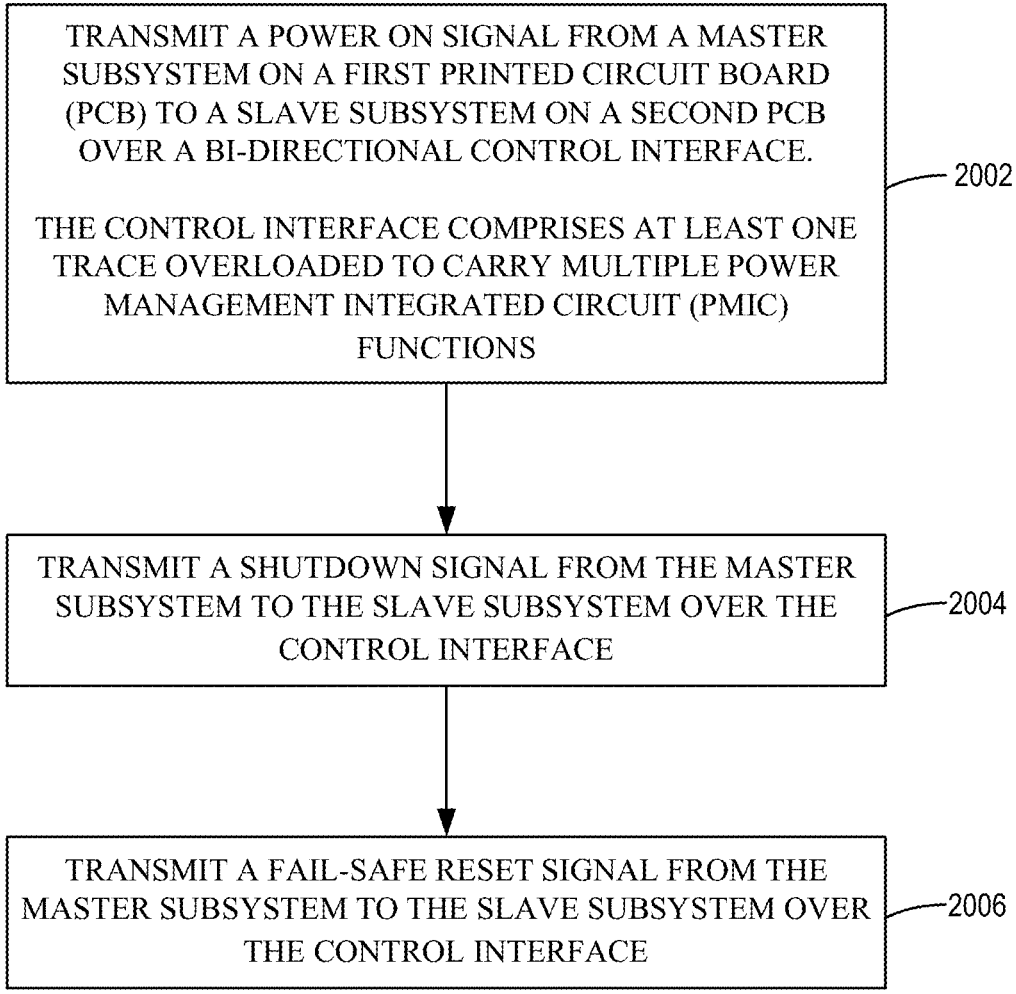
FIG. 20 is a flowchart illustrating a method of integrating systems on separate printed circuit boards (PCBs), according to aspects of the present disclosure.

FIG. 20 is a flowchart illustrating a method of integrating systems on separate printed circuit boards (PCBs), according to aspects of the present disclosure.

As shown in FIG. 20, in some aspects, the process 2000 may include transmitting a power on signal from a master subsystem on a first PCB to a slave subsystem on a second PCB over a bi-directional control interface. The control interface includes at least one trace overloaded to carry a number of PMIC functions (block 2002). For example, the power on signal may comprise a low signal on the control interface for a first time period.

In some aspects, the process 2000 may include transmitting a shutdown signal from the master subsystem to the slave subsystem over the control interface (block 2004). For example, the shutdown signal may comprise a low signal on the control interface for a second time period.

In some aspects, the process 2000 may include transmitting a fail-safe reset signal from the master subsystem to the slave subsystem over the control interface (block 2006). For example, the fail-safe reset signal may comprise a low signal on the control interface for a third time period.

EXAMPLE ASPECTS

Aspect 1: An apparatus, comprising: a first printed circuit board (PCB) supporting a master subsystem including a master power management integrated circuit (PMIC) coupled to a master processor via a first local interface; a second PCB supporting a slave subsystem including a slave PMIC coupled to a slave processor via a second local interface; and a first bi-directional control interface coupling the master processor to the master PMIC and to the slave PMIC, the first control interface comprising at least one trace overloaded to carry a plurality of PMIC functions.

Aspect 2: The apparatus of Aspect 1, in which the master PMIC comprises a transistor having a source coupled to the first control interface via a write pin.

Aspect 3: The apparatus of Aspect 1 or 2, further comprising a current source coupled to the source of the transistor and the first control interface.

Aspect 4: The apparatus of any of the preceding Aspects, further comprising a third PCB supporting a second slave subsystem including a second slave PMIC coupled to a second slave processor via a third local interface, the second slave PMIC coupled to the master PMIC via the first control interface.

Aspect 5: The apparatus of any of the Aspects 1-3, further comprising a third PCB supporting a second slave subsystem including a second slave PMIC coupled to a second slave processor via a third local interface, the second slave PMIC coupled to the master PMIC via a second bi-directional control interface that is independent from the first control interface.

Aspect 6: The apparatus of any of the preceding Aspects, in which the plurality of PMIC functions comprise a shutdown trigger and a fail-safe reset trigger.

Aspect 7: The apparatus of any of the Aspects 1-5, in which the plurality of PMIC functions comprise a power on trigger, a shutdown trigger, and a fail-safe reset trigger.

Aspect 8: The apparatus of any of the Aspects 1-5, in which the plurality of PMIC functions comprise a power on trigger, an acknowledgement from the slave PMIC, a shutdown trigger, and a fail-safe reset trigger.

Aspect 9: The apparatus of any of the Aspects 1-5, in which the plurality of PMIC functions comprise a power on trigger, an acknowledgement from the slave PMIC, a shutdown trigger, slave processor induced shutdown of slave PMIC trigger, and a fail-safe reset trigger.

Aspect 10: The apparatus of any of the preceding Aspects, in which the first control interface couples to the coprocessor and is configured to receive a warm reset signal.

Aspect 11: A method of integrating systems on separate printed circuit boards (PCBs), comprising: transmitting a power on signal from a master subsystem on a first PCB to a slave subsystem on a second PCB over a bi-directional control interface, the control interface comprising at least one trace overloaded to carry a plurality of power management integrated circuit (PMIC) functions; transmitting a shutdown signal from the master subsystem to the slave subsystem over the control interface; and transmitting a fail-safe reset signal from the master subsystem to the slave subsystem over the control interface.

Aspect 12: The method of Aspect 11, in which the power on signal comprises a low signal on the control interface for a first time period, the shutdown signal comprises a low signal on the control interface for a second time period, and the fail-safe reset signal comprises a low signal on the control interface for a third time period, the first, second and third time periods differing from each other.

Aspect 13: The method of Aspect 11 or 12, further comprising receiving an interrupt from the slave subsystem via the control interface.

Aspect 14: The method of any of the Aspects 11-13, in which the interrupt comprises a low signal on the control interface transmitted by a slave power management integrated circuit (PMIC).

Aspect 15: The method of any of the Aspects 11-14, in which the interrupt is responsive to a slave processor of the slave subsystem initiating a shutdown to a slave power management integrated circuit (PMIC) via a local interface.

Aspect 16: An apparatus, comprising: means for transmitting a power on signal from a master subsystem on a first printed circuit board (PCB) to a slave subsystem on a second PCB over a bi-directional control interface, the control interface comprising at least one trace overloaded to carry a plurality of power management integrated circuit (PMIC) functions; means for transmitting a shutdown signal from the master subsystem to the slave subsystem over the control interface; and means for transmitting a fail-safe reset signal from the master subsystem to the slave subsystem over the control interface.

Aspect 17: The apparatus of Aspect 16, in which the power on signal comprises a low signal on the control interface for a first time period, the shutdown signal comprises a low signal on the control interface for a second time period, and the fail-safe reset signal comprises a low signal on the control interface for a third time period, the first, second and third time periods differing from each other.

Aspect 18: The apparatus of Aspect 16 or 17, further comprising means for receiving an interrupt from the slave subsystem via the control interface.

Aspect 19: The apparatus of any of the Aspects 16-18, in which the interrupt comprises a low signal on the control interface transmitted by a slave power management integrated circuit (PMIC).

Aspect 20: The apparatus of any of the Aspects 16-19, in which the interrupt is responsive to a slave processor of the slave subsystem initiating a shutdown to a slave power management integrated circuit (PMIC) via a local interface.

Aspect 21: A non-transitory computer-readable medium having program code recorded thereon, the program code executed by a processor and comprising: program code to transmit a power on signal from a master subsystem on a first printed circuit board (PCB) to a slave subsystem on a second PCB over a bi-directional control interface, the control interface comprising at least one trace overloaded to carry a plurality of power management integrated circuit (PMIC) functions; program code to transmit a shutdown signal from the master subsystem to the slave subsystem over the control interface; and program code to transmit a fail-safe reset signal from the master subsystem to the slave subsystem over the control interface.

Aspect 22: The non-transitory computer-readable medium of Aspect 21, in which the power on signal comprises a low signal on the control interface for a first time period, the shutdown signal comprises a low signal on the control interface for a second time period, and the fail-safe reset signal comprises a low signal on the control interface for a third time period, the first, second and third time periods differing from each other.

Aspect 23: The non-transitory computer-readable medium of Aspect 21 or 22, in which the program code further comprises program code to receive an interrupt from the slave subsystem via the control interface.

Aspect 24: The non-transitory computer-readable medium of any of the Aspects 21-23, in which the interrupt comprises a low signal on the control interface transmitted by a slave power management integrated circuit (PMIC).

Aspect 25: The non-transitory computer-readable medium of any of the Aspects 21-24, in which the interrupt is responsive to a slave processor of the slave subsystem initiating a shutdown to a slave power management integrated circuit (PMIC) via a local interface.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus, comprising:
a first printed circuit board (PCB) supporting a master subsystem including a master power management integrated circuit (PMIC) coupled to a master processor via a first local interface, the first PCB located in an arm of a wearable device;
a second PCB supporting a slave subsystem including a slave PMIC coupled to a slave processor via a second local interface, the second PCB located outside of the arm in the wearable device; and
a single wire first bi-directional control interface coupling a single write pin and a single read pin at the master PMIC to the slave PMIC, the single wire control interface consisting only of a single trace overloaded to carry a plurality of PMIC functions.

2. The apparatus of claim 1, in which the master PMIC comprises a transistor having a source coupled to the single wire control interface via the write pin.

3. The apparatus of claim 2, further comprising a current source coupled to the source of the transistor and the single wire control interface.

4. The apparatus of claim 1, further comprising a third PCB supporting a second slave subsystem including a second slave PMIC coupled to a second slave processor via a third local interface, the second slave PMIC coupled to the master PMIC via the single wire control interface.

5. The apparatus of claim 1, in which the plurality of PMIC functions comprise a shutdown trigger and a fail-safe reset trigger.

6. The apparatus of claim 1, in which the plurality of PMIC functions comprise a power on trigger, a shutdown trigger, and a fail-safe reset trigger.

7. The apparatus of claim 1, in which the plurality of PMIC functions comprise a power on trigger, an acknowledgement from the slave PMIC, a shutdown trigger, and a fail-safe reset trigger.

8. The apparatus of claim 1, in which the plurality of PMIC functions comprise a power on trigger, an acknowledgement from the slave PMIC, a shutdown trigger, slave processor induced shutdown of slave PMIC trigger, and a fail-safe reset trigger.

9. The apparatus of claim 1, in which the single wire control interface couples to a coprocessor and is configured to receive a warm reset signal.

10. A method of integrating systems on separate printed circuit boards (PCBs), comprising:
transmitting a power on signal from a master subsystem on a first PCB in an arm of a wearable device to a slave subsystem on a second PCB outside of the arm of the wearable device over a single write pin and single wire bi-directional control interface, the control interface consisting only of a single trace overloaded to carry a plurality of power management integrated circuit (PMIC) functions;
transmitting a shutdown signal from the master subsystem to the slave subsystem over the control interface; and
transmitting a fail-safe reset signal from the master subsystem to the slave subsystem over the control interface.

11. The method of claim 10, in which the power on signal comprises a low signal on the control interface for a first time period, the shutdown signal comprises a low signal on the control interface for a second time period, and the fail-safe reset signal comprises a low signal on the control interface for a third time period, the first, second and third time periods differing from each other.

12. The method of claim 10, further comprising receiving an interrupt from the slave subsystem via the control interface.

13. The method of claim 12, in which the interrupt comprises a low signal on the control interface transmitted by a slave power management integrated circuit (PMIC).

14. The method of claim 12, in which the interrupt is responsive to a slave processor of the slave subsystem initiating a shutdown to a slave power management integrated circuit (PMIC) via a local interface.

15. An apparatus, comprising:
means for transmitting a power on signal from a master subsystem on a first printed circuit board (PCB) in an arm of a wearable device to a slave subsystem on a second PCB outside of the arm of the wearable device over a single write pin and single wire bi-directional control interface, the control interface consisting only of a single trace overloaded to carry a plurality of power management integrated circuit (PMIC) functions;
means for transmitting a shutdown signal from the master subsystem to the slave subsystem over the control interface; and
means for transmitting a fail-safe reset signal from the master subsystem to the slave subsystem over the control interface.

16. The apparatus of claim 15, in which the power on signal comprises a low signal on the control interface for a first time period, the shutdown signal comprises a low signal on the control interface for a second time period, and the fail-safe reset signal comprises a low signal on the control interface for a third time period, the first, second and third time periods differing from each other.

17. The apparatus of claim 15, further comprising means for receiving an interrupt from the slave subsystem via the control interface.

18. The apparatus of claim 17, in which the interrupt comprises a low signal on the control interface transmitted by a slave power management integrated circuit (PMIC).

19. The apparatus of claim 17, in which the interrupt is responsive to a slave processor of the slave subsystem initiating a shutdown to a slave power management integrated circuit (PMIC) via a local interface.

20. A non-transitory computer-readable medium having program code recorded thereon, the program code executed by a processor and comprising:
   program code to transmit a power on signal from a master subsystem on a first printed circuit board (PCB) in an arm of a wearable device to a slave subsystem on a second PCB outside of the arm of the wearable device over a single write pin and single wire bi-directional control interface, the control interface consisting only of a single trace overloaded to carry a plurality of power management integrated circuit (PMIC) functions;
   program code to transmit a shutdown signal from the master subsystem to the slave subsystem over the control interface; and
   program code to transmit a fail-safe reset signal from the master subsystem to the slave subsystem over the control interface.

21. The non-transitory computer-readable medium of claim 20, in which the power on signal comprises a low signal on the control interface for a first time period, the shutdown signal comprises a low signal on the control interface for a second time period, and the fail-safe reset signal comprises a low signal on the control interface for a third time period, the first, second and third time periods differing from each other.

22. The non-transitory computer-readable medium of claim 20, in which the program code further comprises program code to receive an interrupt from the slave subsystem via the control interface.

23. The non-transitory computer-readable medium of claim 22, in which the interrupt comprises a low signal on the control interface transmitted by a slave power management integrated circuit (PMIC).

24. The non-transitory computer-readable medium of claim 22, in which the interrupt is responsive to a slave processor of the slave subsystem initiating a shutdown to a slave power management integrated circuit (PMIC) via a local interface.

* * * * *